US010630525B2

United States Patent
Abdoli et al.

(10) Patent No.: US 10,630,525 B2
(45) Date of Patent: *Apr. 21, 2020

(54) RESOURCE GRID OFFSET INDICATION IN MIXED NUMEROLOGIES

(71) Applicant: Huawei Technologies Co., Ltd., Shenzhen (CN)

(72) Inventors: Javad Abdoli, Kanata (CA); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,852

(22) Filed: Jul. 24, 2019

(65) Prior Publication Data
US 2019/0349241 A1 Nov. 14, 2019

Related U.S. Application Data

(63) Continuation of application No. 16/237,997, filed on Jan. 2, 2019.
(Continued)

(51) Int. Cl.
  *H04L 27/26* (2006.01)
  *H04W 72/04* (2009.01)
  (Continued)

(52) U.S. Cl.
  CPC ........ *H04L 27/2666* (2013.01); *H04L 5/0092* (2013.01); *H04L 7/10* (2013.01);
  (Continued)

(58) Field of Classification Search
  None
  See application file for complete search history.

(56) References Cited

U.S. PATENT DOCUMENTS

2017/0331670 A1  11/2017  Parkvall et al.
2017/0332378 A1  11/2017  Werner et al.
(Continued)

FOREIGN PATENT DOCUMENTS

WO  2017197155 A1  11/2017
WO  2017217903 A1  12/2017

OTHER PUBLICATIONS

"5G; NR; Physical channels and modulation (3GPP TS 38.211 version 15.2.0 Release 15)" ETSI TS 138 211 V15.2.0, Date: Jul. 2018; pp. 1-97.*

(Continued)

*Primary Examiner* — Xavier S Wong
(74) *Attorney, Agent, or Firm* — Slater Matsil, LLP

(57) ABSTRACT

Systems and methods are provided for configuring an alignment between various resource grids. A base station transmits alignment information between a first resource grid or a first transmission using the first resource grid, and a second resource grid and a third resource grid. The first resource grid uses a first sub-carrier spacing (SCS) from a first set of SCSs, the second resource grid uses a second SCS from a second set of SCSs, the third resource grid uses a third SCS from the second set of SCSs. The base station transmits a synchronization sequence block (SSB) using the first resource grid, and the base station transmits a first physical downlink shared channel (PDSCH) in assigned resource blocks using at least one of the second resource grid and the third resource grid. A user equipment receives the alignment information.

20 Claims, 17 Drawing Sheets

Related U.S. Application Data

(60) Provisional application No. 62/615,216, filed on Jan. 9, 2018.

(51) Int. Cl.
*H04L 7/10* (2006.01)
*H04L 5/00* (2006.01)

(52) U.S. Cl.
CPC ........ *H04L 27/2602* (2013.01); *H04L 27/266* (2013.01); *H04L 27/2675* (2013.01); *H04W 72/0453* (2013.01)

(56) References Cited

U.S. PATENT DOCUMENTS

| | | |
|---|---|---|
| 2017/0367120 A1 | 12/2017 | Murray et al. |
| 2018/0376454 A1* | 12/2018 | strom .................. H04W 72/005 |
| 2019/0124609 A1* | 4/2019 | Gheorghiu ............ H04W 56/00 |
| 2019/0150068 A1* | 5/2019 | Montojo ............... H04W 28/26 370/329 |
| 2019/0159226 A1* | 5/2019 | Ly ....................... H04W 56/001 |

OTHER PUBLICATIONS

"3rd Generation Partnership Project; Technical Specification Group Radio Access Network; NR; Physical channels and modulation (Release 15)", 3GPP TS 38.11, V2.0.0, Dec. 2017, 73 Pages.

"Ran1 Chairman's Notes", 3GPP TSG RAN WG1 Meeting 90ibs, Oct. 2017, 162 Pages.

"Rani Chairman's Notes", 3GPP TSG RAN WG1 Meeting 91, Nov.-Dec. 2017, 180 Pages.

\* cited by examiner

RESOURCE GRID OFFSET INDICATION IN MIXED NUMEROLOGIES

CROSS-REFERENCE TO RELATED APPLICATIONS

This application is a continuation of U.S. application Ser. No. 16/237,997, filed on Jan. 2, 2019, which claims the benefit of U.S. Provisional Application No. 62/615,216, filed Jan. 9, 2018, applications of which are hereby incorporated by reference in their entireties.

TECHNICAL FIELD

The present disclosure relates generally to a system and method for wireless communication, and, in particular embodiments, to a system and method for resource grid offset indication in mixed numerologies.

BACKGROUND

5$^{th}$ generation mobile networks (5G) are the proposed next generation of telecommunications standards beyond the current 4G standards. Some goals of 5G include higher capacity than current 4G, thereby allowing a higher density of mobile broadband users. 5G also proposes to support device-to-device, ultra-reliable, and massive machine communications. Additionally, 5G proposes to provide faster data transfer rates than are currently available. However, in order to achieve these goals, a number of problems must be addressed and solved.

Different numerologies may be used on different channels. Different numerologies have different sub-carrier spacings (SCS) and/or cyclic prefixes, for example. Transmission on each channel, using the respective numerology, employs a respective resource grid which consists of subcarriers spaced by the SCS of the numerology. Some transmissions may occur in units of resource blocks (RBs), each resource block occupying a fixed number of sub-carriers. An RB grid may be defined based on the resource grid. For any transmission on a resource grid, the transmission will use a set of subcarriers on the grid including a lowest frequency subcarrier.

SUMMARY

According to one aspect of the present disclosure, there is provided a method comprising: transmitting, by a base station (BS), alignment information between a first resource grid or a first transmission using the first resource grid, and a second resource grid and a third resource grid, wherein the first resource grid uses a first sub-carrier spacing (SCS) from a first set of SCSs, the second resource grid uses a second SCS from a second set of SCSs, the third resource grid uses a third SCS from the second set of SCSs; transmitting, by the base station, a synchronization sequence block (SSB) using the first resource grid; transmitting, by the BS, a first physical downlink shared channel (PDSCH) in assigned resource blocks using at least one of the second resource grid and the third resource grid.

Optionally, transmitting alignment information comprises, transmitting, by the BS, signaling conveying an offset; wherein the offset indicates the alignment information between a particular RB of the second resource grid relative to the SSB.

Optionally, the offset further indicates the alignment between a particular RB of the third resource grid relative to the SSB.

Optionally, the at least one of the second resource grid and the third resource grid is the third resource grid and the first PDSCH carries remaining minimum system information (RMSI).

Optionally, the first set of SCSs comprises: {15 kHz, 30 kHz} or {120 kHz, 240 kHz} or {15 kHz, 30 kHz, 120 kHz, 240 kHz}.

Optionally, the second set of SCSs comprises: {15 kHz, 30 kHz} or {15 kHz, 60 kHz} or {30 kHz, 60 kHz} or {15 kHz, 30 kHz, 60 kHz} or {120 kHz, 240 kHz} or {60 kHz, 120 kHz} or {60 kHz, 120 kHz, 240 kHz} or {15 kHz, 30 kHz, 60 kHz, 120 kHz, 240 kHz} or {7.5 kHz, 15 kHz} or a superset of two or more of these said sets.

According to another aspect of the present disclosure, there is provided a method comprising: receiving, by a user equipment (UE), alignment information between a first resource grid or a first transmission using the first resource grid, and a second resource grid and a third resource grid, wherein the first resource grid uses a first sub-carrier spacing (SCS) from a first set of SCSs, the second resource grid uses a second SCS from a second set of SCSs, the third resource grid uses a third SCS from the second set of SCSs; receiving, by the UE, a synchronization sequence block (SSB) using the first resource grid; receiving, by the UE, a first physical downlink shared channel (PDSCH) in assigned resource blocks using at least one of the second resource grid and the third resource grid.

Optionally, receiving alignment information comprises, receiving, by the UE, signaling conveying an offset; wherein the offset indicates the alignment information between a particular RB of the second resource grid relative to the SSB.

Optionally, the offset further indicates the alignment between a particular RB of the third resource grid relative to the SSB.

Optionally, the at least one of the second resource grid and the third resource grid is the third resource grid and the first PDSCH carries remaining minimum system information (RMSI).

Optionally, the first set of SCSs comprises: {15 kHz, 30 kHz} or {120 kHz, 240 kHz} or {15 kHz, 30 kHz, 120 kHz, 240 kHz}.

Optionally, the second set of SCSs comprises: {15 kHz, 30 kHz} or {15 kHz, 60 kHz} or {30 kHz, 60 kHz} or {15 kHz, 30 kHz, 60 kHz} or {120 kHz, 240 kHz} or {60 kHz, 120 kHz} or {60 kHz, 120 kHz, 240 kHz} or {15 kHz, 30 kHz, 60 kHz, 120 kHz, 240 kHz } or {7.5 kHz, 15 kHz} or a superset of two or more of these said sets.

According to another aspect of the present invention, there is provided a base station comprising: a processor; and a non-transitory computer readable storage medium storing programming for execution by the processor, the programming including instructions to: transmit alignment information between a first resource grid or a first transmission using the first resource grid, and a second resource grid and a third resource grid, wherein the first resource grid uses a first sub-carrier spacing (SCS) from a first set of SCSs, the second resource grid uses a second SCS from a second set of SCSs, the third resource grid uses a third SCS from the second set of SCSs; transmit a synchronization sequence block (SSB) using the first resource grid; transmit a first physical downlink shared channel (PDSCH) in assigned resource blocks using at least one of the second resource grid and the third resource grid.

Optionally, the base station is configured to transmit the alignment information by transmitting, by the BS, signaling conveying an offset; wherein the offset indicates the alignment information between a particular RB of the second resource grid relative to the SSB.

Optionally, the offset further indicates the alignment between a particular RB of the third resource grid relative to the SSB.

Optionally, the at least one of the second resource grid and the third resource grid is the third resource grid and the first PDSCH carries remaining minimum system information (RMSI).

Optionally, the first set of SCSs comprises: {15 kHz, 30 kHz} or {120 kHz, 240 kHz} or {15 kHz, 30 kHz, 120 kHz, 240 kHz}.

Optionally, the second set of SCSs comprises: {15 kHz, 30 kHz} or {15 kHz, 60 kHz} or {30 kHz, 60 kHz} or {15 kHz, 30 kHz, 60 kHz} or {120 kHz, 240 kHz} or {60 kHz, 120 kHz, 240 kHz} or {60 kHz, 120 kHz, 240 kHz} or {15 kHz, 30 kHz, 60 kHz, 120 kHz, 240 kHz} or {7.5 kHz, 15 kHz} or a superset of two or more of these said sets.

According to another aspect of the present disclosure, there is provided a user equipment comprising: a processor; and a non-transitory computer readable storage medium storing programming for execution by the processor, the programming including instructions to: receive alignment information between a first resource grid or a first transmission using the first resource grid, and a second resource grid and a third resource grid, wherein the first resource grid uses a first sub-carrier spacing (SCS) from a first set of SCSs, the second resource grid uses a second SCS from a second set of SCSs, the third resource grid uses a third SCS from the second set of SCSs; receive a synchronization sequence block (SSB) using the first resource grid; receive a first physical downlink shared channel (PDSCH) in assigned resource blocks using at least one of the second resource grid and the third resource grid.

Optionally, the UE is configured to receive alignment information by receiving signaling conveying an offset; wherein the offset indicates the alignment information between a particular RB of the second resource grid relative to the SSB.

Optionally, the offset further indicates the alignment between a particular RB of the third resource grid relative to the SSB.

Optionally, the at least one of the second resource grid and the third resource grid is the third resource grid and the first PDSCH carries remaining minimum system information (RMSI).

Optionally, the first set of SCSs comprises: {15 kHz, 30 kHz} or {120 kHz, 240 kHz} or {15 kHz, 30 kHz, 120 kHz, 240 kHz}.

Optionally, the second set of SCSs comprises: {15 kHz, 30 kHz} or {15 kHz, 60 kHz} or {30 kHz, 60 kHz} or {15 kHz, 30 kHz, 60 kHz} or {120 kHz, 240 kHz} or {60 kHz, 120 kHz, 240 kHz} or {60 kHz, 120 kHz, 240 kHz} or {15 kHz, 30 kHz, 60 kHz, 120 kHz, 240 kHz} or {7.5 kHz, 15 kHz} or a superset of two or more of these said sets.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
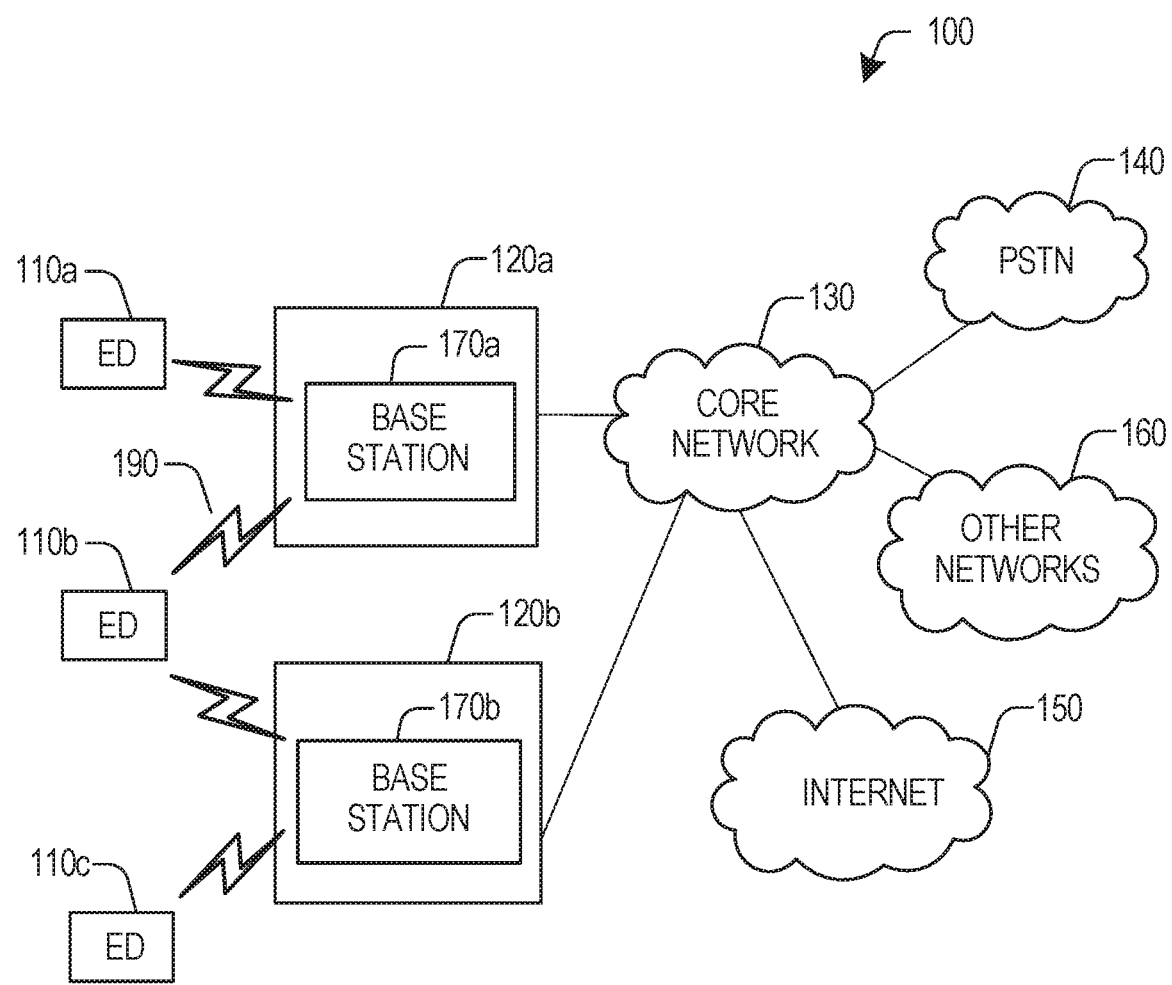
FIG. 1 is a network diagram of a communication system.

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the invention provide systems and methods that may be used to support multiple, in some cases at least 3, numerologies in co-existence in one carrier. It is noted that existing solutions can only support one or two numerologies in co-existence in one carrier. In addition, existing solutions can support only SCS=f0 and SCS=2*f0 mixed numerologies. Embodiments of the invention provide support for more flexible mixed numerology, SCS=f0 and SCS=$2^n$*f0, where n is an integer number. To achieve this, some embodiments do not introduce any additional signaling overhead; other embodiments introduce a small signaling overhead.

A subcarrier is the smallest unit of transmission. In some embodiments, a RB is the smallest unit for scheduling. A RB is composed of a set of OFDM subcarriers having a SCS. In some embodiments, the SCS for a given transmission is one of a scaled set of sub-carrier spacings. In a specific example, the set includes SCSs of 15 kHz, 30 kHz, 60 kHz, 120 kHz, and 240 kHz. However, the embodiments described herein can be applied to other sets of SCSs. In some embodiments, irrespective of the SCS, each RB has 12 subcarriers.

Examples of types of transmission that use subcarriers or RBs for transmission include:

a. SS/PBCH block(a synchronization sequence and a primary broadcast channel block), hereinafter synchronization sequence block (SSB);

b. SI (system information);

c. RMSI (remaining minimum system information);

d. PDSCH (physical downlink shared channel); and e. PUSCH (physical uplink shared channel)

Resource block (RB) is general term, which in the absence of further specific restriction, can refer, for example, to a physical resource block (PRB), a common resource block (CRB), a carrier resource block, a reference resource block or a virtual resource block (VRB).

A first resource grid is used for the SSB in the frequency domain consisting of subcarrier locations spaced by the SCS of the SSB. The resources used for the SSB are characterized by subcarrier numbers k relative to the start of the SSB as indicated in Table 1 below. Subcarriers are in the frequency domain. Subcarrier number k with respect to the start of SSB means that the subcarriers of the SSB are numbered from 0 to N−1 with subcarrier o being the starting subcarrier of the SSB (i.e. the subcarrier with the lowest frequency). Then, subcarrier k is the k'th subcarrier in the range. Table 1 below shows resources within an SSB for primary synchronization sequence (PSS), secondary synchronization sequence (SSS), PBCH, and demodulation reference symbol (DM-RS) for PBCH.

TABLE 1

| Channel or signal | OFDM symbol number l relative to the start of an SSB | Subcarrier number k relative to the start of an SSB |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 236 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

At least one second resource grid is used for common resource blocks, carrier resource blocks or reference resource blocks or other resource blocks. Each second resource grid is characterized by a set of adjacent positions for the resource blocks, including an alignment of at least one resource block boundary with an SSB. As used herein, a first resource grid is any resource grid defined in units of sub-carriers. A second resource grid is any resource grid defined in units of RBs. There can be multiple second resource grids.

There can, for example, be a second resource grid for common resource blocks containing certain content, for example, for RMSI. There can be another second resource grid for common resource blocks containing other content, for example for PPDSCH configured by cell-radio network temporary identifier (C-RNTI) semi-persistent scheduling (SPS) C-RNTI and/or temporary C-RNTI, and/or by system information (SI)-RNTI, and/or paging (P)-RNTI, and/or random access (RA)-RNTI and/or control resource set (CORESET) for these PDSCH, and/or PUSCH configured by C-RNTI, and/or SPS C-RNTI and/or temporary C-RNTI.

In the above:
a. PDSCH or PUSCH configured by C-RNTI or SPS C-RNTI can include (but optionally are not limited to) PDSCH/PUSCH carrying traffic data.
b. PDSCH configured by SI-RNTI can include (but optionally are not limited to) PDSCH carrying system information including RMSI, and/or other system information (OSI) and/or other system information.
c. PDSCH configured by P-RNTI can include (but optionally are not limited to) PDSCH carrying paging information.
d. PDSCH configured by RA-RNTI can include (but optionally not limited to) PDSCH carrying RACH information.
e. RMSI can include (but optionally is not limited to) remaining minimum system information.

Depending on configuration, these channels may be transmitted with the same or different SCSs. Accordingly, the RBs for the various channels may have the same or different SCS.

Referring to Table 2 below, for sub 6 GHz carrier frequency, a set of possible permutations of SCSs is shown.

TABLE 2

| SCS for SSB (kHz) | SCS of Common resource block, e.g. for RMSI (kHz) | SCS of Common resource block e.g. for PDSCH configured by C-RNTI (kHz) |
|---|---|---|
| 15 | 15 | 15 |
| 15 | 15 | 30 |
| 15 | 15 | 60 |
| 15 | 30 | 15, 30 |
| 15 | 30 | 60 |
| 30 | 15, 30 | 15, 30 |
| 30 | 15, 30 | 60 |

Referring to Table 3 below, for above a 6 GHz carrier frequency, a set of possible permutations of SCSs is shown.

TABLE 3

| SCS of for SSB (kHz) | SCS of Common resource block, e.g. for RMSI (kHz) | SCS of Common resource block e.g. for PDSCH configured by C-RNTI (kHz) |
|---|---|---|
| 120 | 60, 120 | 60, 120 |
| 120 | 60, 120 | 240 |
| 240 | 60, 120 | 60, 120, 240 |

It should be understood that different SCS permutations than those included in Tables 2 and 3 may alternatively be used. In Tables 2 and 3, the first resource grid (of subcarriers) is used for the first column, and a respective second resource grid (of resource blocks) is used for the second and third columns.

The resource grids may or may not be aligned for different SCS. While the UE can ascertain the first resource grid for the SSB, the UE needs to be able to determine the second resource grids through other mechanisms.

Embodiments of the invention provide methods of determining and/or signaling an alignment between resource grids for the various SCS, where there are mixed numerologies for PDSCH carrying different information, for example PDSCH carrying RMSI using SCS 1, PDSCH carrying traffic data using SCS 2 and PDSCH carrying traffic data using SCS 3. Alternatively, the methods may be used to determine and/or signal an alignment between an SSB and a particular common resource block which may be specified through higher layer signaling, e.g. radio resource control signaling, which effectively also defines a second resource grid used for the specific common resource block. For example, if signaling indicates an alignment between the SSB having a first SCS and PDSCH RB #22 having a second SCS, this situates RB #22, but also defines a resource grid in units of RBs for the PDSCH which extends below the position of RB #22 (including adjacent RB positions below that of RB #22) and above the position of RB #22 (including adjacent positions above RB #22).

Figure 3:
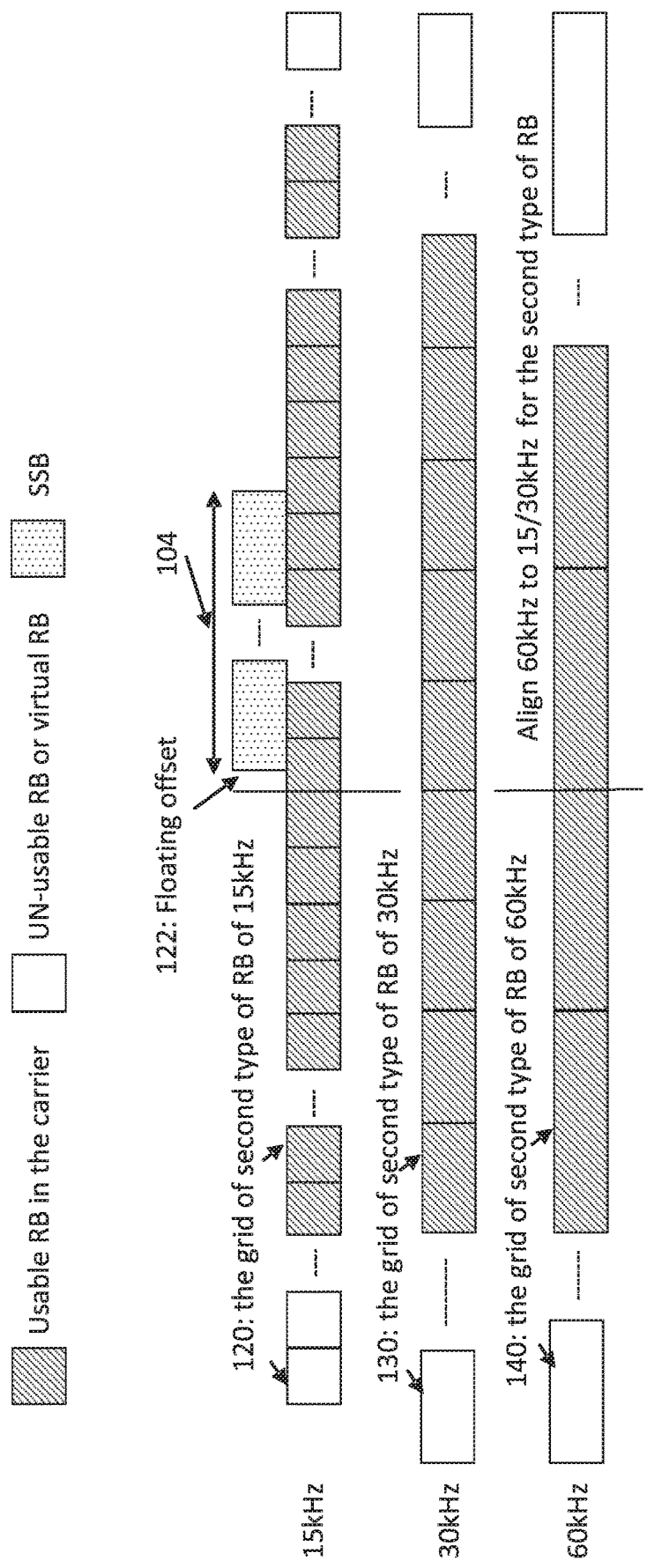
FIGS. 3 to 8 are examples of resource grids in accordance with embodiments of the invention.

Referring to FIG. 3, shown is SSB 104 which occupies part of a first resource grid (not shown) consisting of sub-carriers having an SCS. In some embodiments, the SCS of the SSB is limited to belonging to a first set of SCS. In a specific example, the first set of SCS for the SSB includes 15 kHz and 30 kHz.

A UE can perform synchronization and master system information acquisition based on the SSB 104, and based on that synchronization, the UE can ascertain the location of the first resource grid. The UE can also ascertain the location of the lowest frequency subcarrier (not shown) of the SSB. More generally, there may be some reference block that is transmitted by the network, and which the UE can process to ascertain the resource grid employed for transmission of the reference block.

Also shown is a second resource grid 120, shown in units of RBs, for a case where the second resource grid has the same SCS as the first resource grid. For example, where RMSI is carried in the second grid 120, both the SSB and RMSI might have 15 kHz SCS, or they both might have 30 kHz SCS. The second resource grid 120 for the RMSI is aligned relative to the SSB 104 by offset 122, meaning that the first subcarrier of a particular RB 122 used for RMSI in the second resource grid is offset in frequency location from the first subcarrier of SSB 104 by offset 122. In a specific example, the particular RB 122 may be specified using higher layer signaling.

In some embodiments, this offset is signaled to the UE using, 4 or 5 bits, allowing for a set of different possible offsets. Thus, using the 4 or 5 bit signaling, and the determined location of the SSB, the UE can ascertain the second grid 120/location of particular RB used for the RMSI with the same SCS. The second grid 120 can be said to be floating relative to the SSB 104 by the offset amount. The signaled offset is a multiple of the SCS, in this case, a multiple of 15 kHz. The second resource grid 120 includes a set of usable RBs within a carrier bandwidth, and may also include un-usable or virtual RBs.

First Option—Align the Second Resource Grid for a Set of SCS with the Lowest Subcarrier of SSB with Floating Offset In some embodiments, each second resource grid/or location of particular RB, used for example for PDSCH transmission, for all possible numerologies for PDSCH transmission, is aligned with the lowest subcarrier of the SSB with an offset, for example as indicated by the 4 or 5 bit signaling in units of 15 kHz SCS or 60 kHz SCS or other SCS. Of course, it should be understood that the offset can be signaled to a different resolution than 15 kHz or 60 kHz. This method might be applied for downlink transmission in a primary cell in a paired spectrum application, or on the uplink or downlink of the primary cell in an unpaired spectrum, but can also be applied in other contexts.

An example is shown in FIG. 3. As described above, the SSB 104 uses 15 kHz SCS, and a second resource grid 120 is used for PDSCH carrying RMSI and has 15 kHz SCS. Also shown is an another second resource grid 130 having a 30 kHz SCS. The second resource grid 130 or a location of a particular RB of 30 kHz is aligned with the lowest sub-carrier SSB 104 after shifting by the floating offset amount 122. The floating offset is in units of 15 kHz. In a second example, another second resource grid 140 is shown having a 60 kHz SCS. In this case, the second resource grid 140 of 60 kHz or a particular RB on the grid is aligned with the first sub-carrier SSB 104 after shifting by the floating offset amount 122. The floating offset is in unit of 15 kHz.

In a third example (not shown), a first resource grid for the SSB includes sub-carriers with a 30 kHz SCS, a second resource grid for PDSCH carrying RMSI has 15 kHz SCS, and a second resource grid for PDSCH carrying other information has a 60 kHz SCS. The second resource grid of 60 kHz or a location of a particular RB on the grid is aligned with the first sub-carrier of the SSB after shifting by the floating offset amount. The floating offset is in units of 15 kHz.

In a fourth example (not shown), a first resource grid for the SSB includes subcarriers with a 30 kHz SCS, a second resource grid for PDSCH carrying RMSI has 30 kHz SCS, and a second resource grid for PDSCH carrying other information has a 60 kHz SCS. The second resource grid of 60 kHz or a location of a particular RB on the grid is aligned with the first RB of the SSB after shifting by the floating offset amount. The floating offset is in units of 15 kHz.

In a fifth example (not shown), a resource grid for the SSB includes subcarriers with a 120 kHz SCS, a second resource grid for PDSCH carrying RMSI has 60 kHz SCS, and a second resource grid for PDSCH carrying other information has a 240 kHz SCS. The second resource grid of 240 kHz or a particular RB on the grid is aligned with the first sub-carrier of the SSB after shifting by the floating offset amount. The floating offset is in units of 60 kHz.

In a sixth example (not shown), a resource grid for the SSB has subcarriers with a 120 kHz SCS, a second resource grid for PDSCH carrying RMSI has 120 kHz SCS, and a second resource grid for PDSCH carrying other information has a 240 kHz SCS. The second resource grid of 240 kHz or a particular RB on the grid is aligned with the first sub-carrier of the SSB after shifting by the floating offset amount. The floating offset is in units of 60 kHz.

Note that the above examples can be combined, such that multiple SCS are used for respective transmissions using respective second resource grids.

Second Option—Align the Second Resource Grid for a Set of SCS with the Lowest Sub-Subcarrier of Lowest RB of RMSI or RMSI CORESET In another embodiment, the second resource grid for all numerologies in a set are aligned with the lowest RB of RMSI or RMSI control resource set (CORESET). The difference between the second option and the first option described above is that with first option, resource grid alignment/particular RB alignment is with lowest sub-carrier of SSB+Offset, whereas with second option, resource grid alignment/particular RB alignment is with the lowest frequency sub-carrier of lowest RB of the RMSI or RMSI CORESET. This method might be applied for downlink transmission of a primary cell in a paired spectrum application, or both downlink and uplink of a primary cell in unpaired spectrum, but can also be applied in other contexts.

Figure 4:
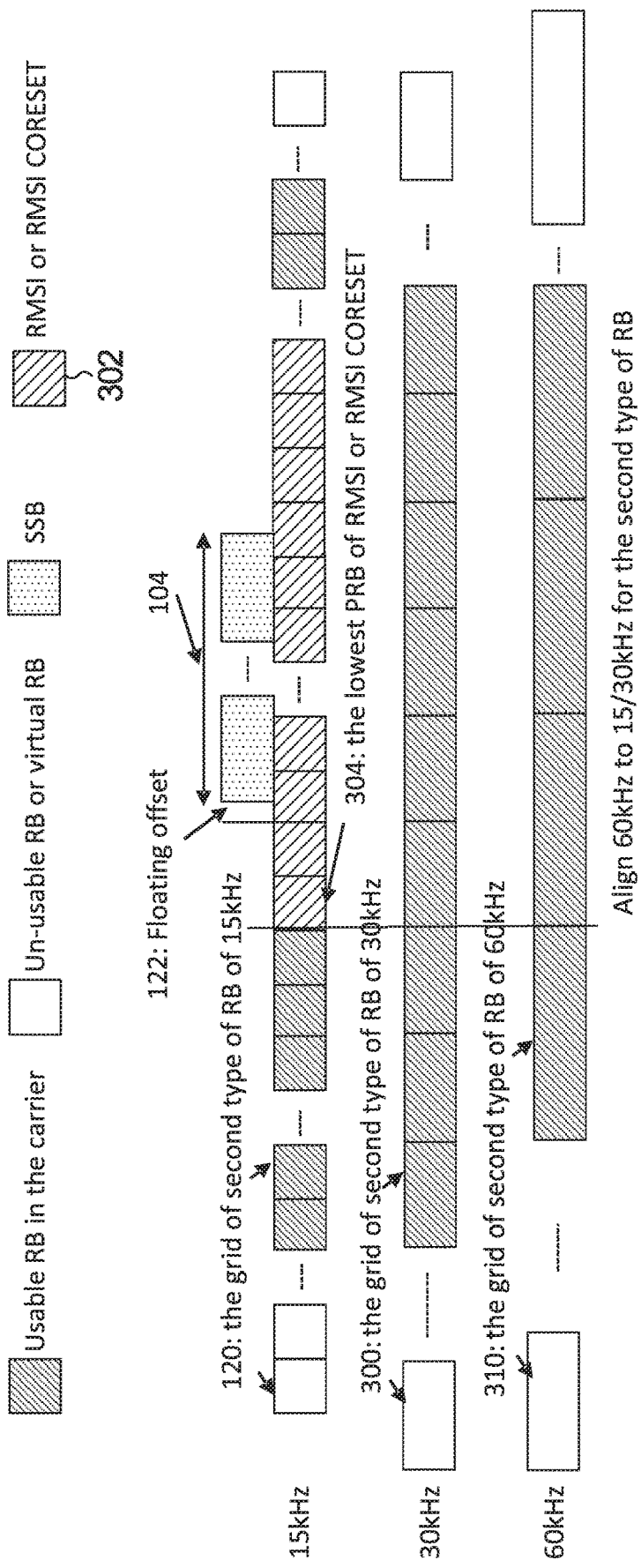

A first example is shown in FIG. 4. Here, the first resource grid (not shown) is 15 kHz SCS, a second resource grid 120 for the PDSCH carrying RMSI has 15 kHz SCS, and shown is another second resource grid 300 for RBs with a 30 kHz SCS. An RMSI or RMSI CORESET 302 is shown on the grid 120, including a lowest frequency RB 304. The grid 300 or a particular RB on the grid is aligned with the lowest frequency RB 304 of RMSI or RMSI CORESET 302 in that the lowest frequency subcarrier of the particular RB is aligned with lowest frequency sub-carrier for the lowest frequency RB 304. In a second example, also shown is a grid 310 for a second resource grid for RBs with a 60 kHz SCS. The grid 310 or a particular RB on the grid is aligned with the first RB 304 of RMSI or RMSI CORESET 302.

In a third example (not shown), the resource grid for SSB has 30 kHz SCS, a second resource grid for PDSCH carrying RMSI or RMSI CORESET grid has 15 kHz SCS, and another second grid has a 60 kHz SCS. The second resource grid of 60 kHz or a particular RB on the grid is aligned with the first RB of RMSI or RMSI CORESET.

In a fourth example (not shown)the resource grid for SSB has 30 kHz SCS, a second resource grid for PDSCH carrying RMSI or RMSI CORESET has 30 kHz SCS, and another second resource grid has a 60 kHz SCS. The grid for the second resource grid of 60 kHz or a particular RB on the grid is aligned with the first RB of RMSI or RMSI CORESET.

In a fifth example (not shown) the resource grid for SSB is 120 kHz SCS, a second grid for the PDSCH carrying RMSI or RMSI CORESET has 60 kHz SCS, and another second resource grid has a 240 kHz SCS. The grid for the second resource grid with 240 kHz or a particular RB on the gird is aligned with the first RB of RMSI or RMSI CORESET.

In a sixth example (not shown), the resource grid for SSB has 120 kHz SCS, a second resource grid for the PDSCH carrying RMSI or RMSI CORESET has 120 kHz SCS, and another second resource grid has a 240 kHz SCS. The grid for the second resource grid of 240 kHz or a particular RB on the grid is aligned with the first RB of RMSI SSB or RMSI CORESET.

Third Option—Align the Second Resource Grid for a Set of SCS with ARFCN of the UL Indicated in the RMSI, After Floating ARFCN is Resolved In another embodiment, for uplink transmission, the second resource grid for all numerologies in a set are aligned by an offset relative to a frequency of an absolute radio-frequency channel number (ARFCN) of the uplink, as indicated in the RMSI. The ARFCN offset indicated in the RMSI, for example using 4 or 5 bits, can be referred to as a floating ARFCN. With this embodiment, the resource grid is aligned with the floating ARFCN of the uplink. This approach might, for example, be applied for the uplink of a primary cell in unpaired spectrum, but can also be applied in other contexts.

Figure 5:
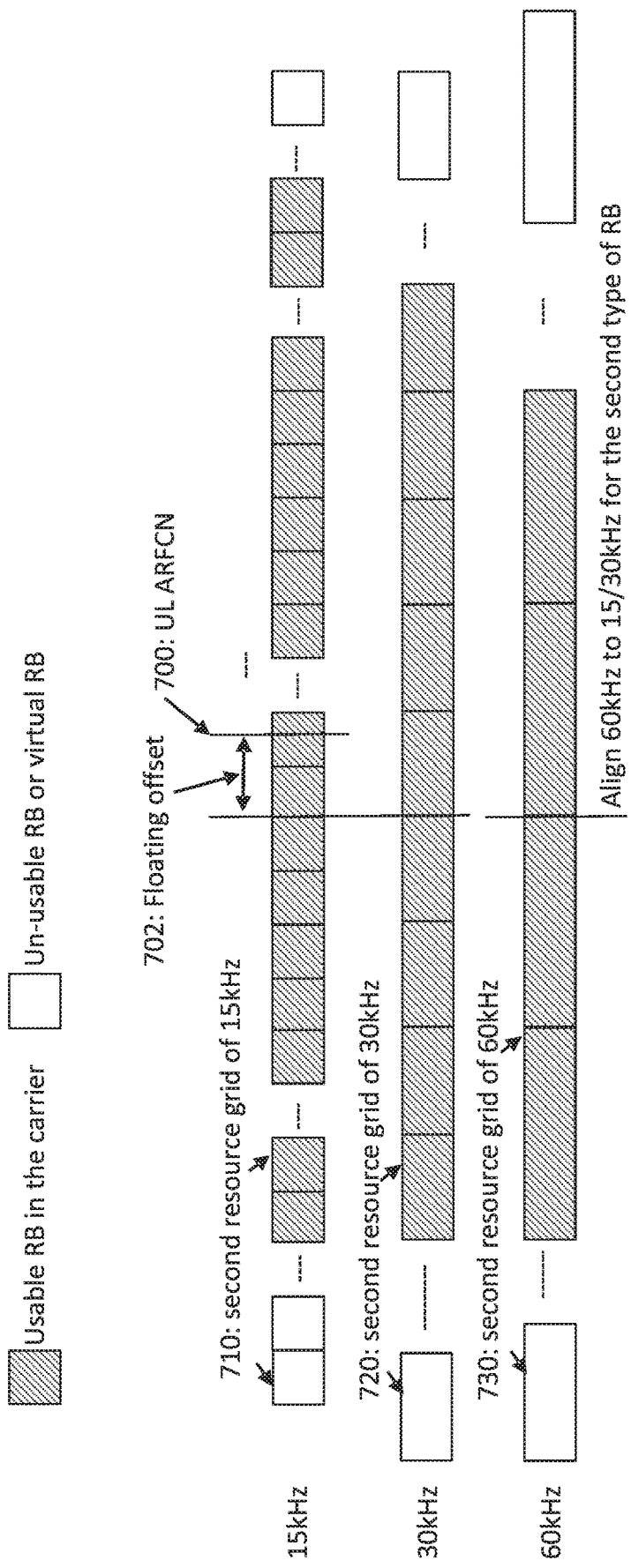

Examples are shown in FIG. 5. Shown at 700 is the frequency location of an uplink ARFCN. This may, for example be a secondary cell ARFCN or supplemental uplink ARFCN. A floating offset is indicated at 702. This may, for example, be indicated using RMSI. A second resource grid 710 is shown having SCS 15 kHz. The second resource grid 710 grid/particular RB is aligned with the ARFCN after application of the floating offset 702. Another second resource grid 720 is shown having SCS 30 kHz. The second resource grid 720 or a particular RB on the grid is aligned with the ARFCN after application of the floating offset 702. Another second resource grid 730 is shown having SCS 60 kHz. The resource grid 730 or a particular RB on the grid is aligned with the ARFCN after application of the floating offset 702.

Fourth Option—Resource Grids of a Set of Numerologies are Aligned with the ARFCN of the Seen/SIM Indicated in Seen/SIM Configuration, After Floating ARFCN is Resolved.

In another embodiment, resource grids of all numerologies are aligned by an offset relative to an ARFCN of the secondary cell, or supplemental uplink as indicated in secondary cell/supplemental uplink configuration. The ARFCN of the secondary cell or supplemental uplink shifted by an amount indicated in the configuration, for example using 4 or 5 bits, can be referred to as a floating ARFCN of the secondary cell or supplemental cell. With this embodiment, the resource grid is aligned with the floating ARFCN of the secondary cell or supplemental cell. This approach might, for example, be applied a secondary cell, supplemental uplink but can also be applied in other contexts.

Figure 6:
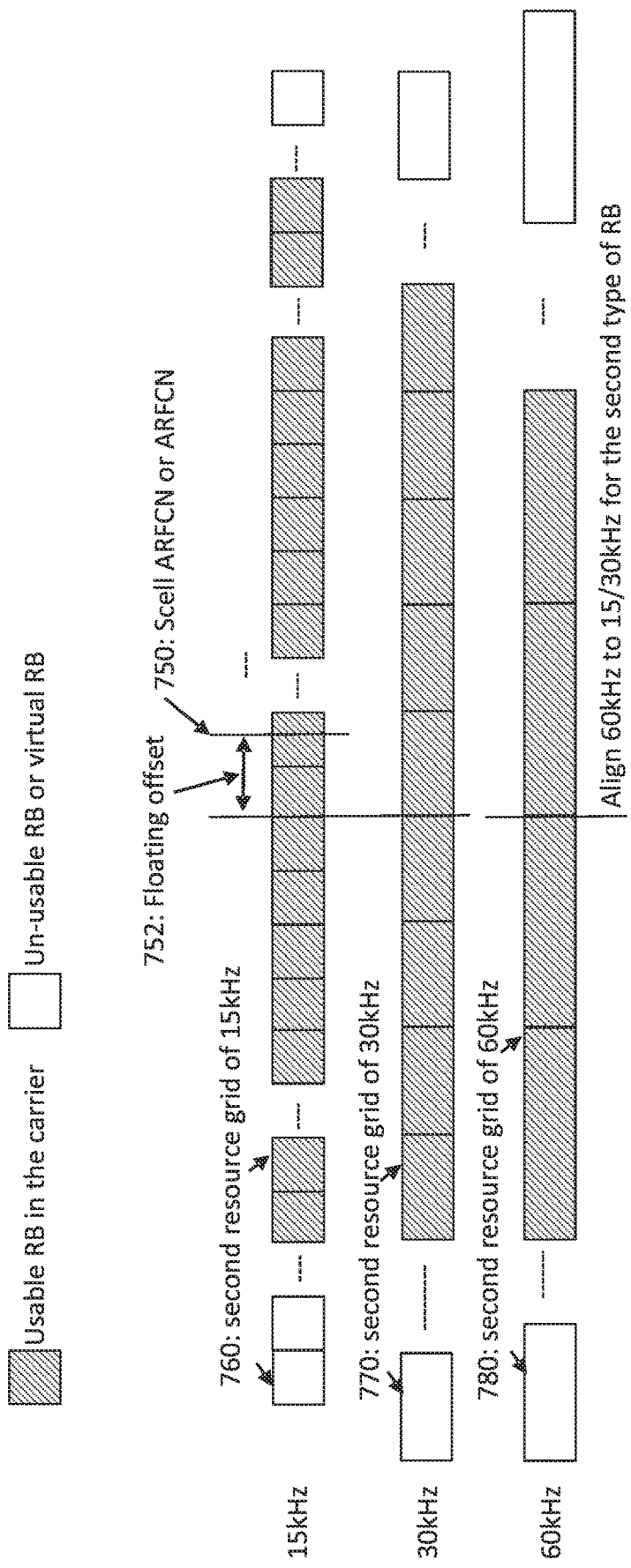

Examples are shown in FIG. 6. Shown at 750 is the frequency location of secondary cell ARFCN or supplemental uplink ARFCN. A floating offset is indicated at 752. This may, for example, be indicated using RMSI. A second resource grid 760 is shown having SCS 15 kHz. The second grid 760 grid is aligned with the secondary cell ARFCN or supplemental uplink ARFCN after application of the floating offset 762. Another second grid 770 is shown having SCS 30 kHz. The second grid 770 is aligned with the secondary cell ARFCN or supplemental uplink ARFCN after application of the floating offset 752. Another second resource grid 780 is shown having SCS 60 kHz. The resource grid 780 is aligned with the secondary cell ARFCN or supplemental uplink ARFCN after application of the floating offset 752.

Embodiments that Employ Additional Signaling

The above-described embodiments make use of signaling that is already in place for other purposes, for indicating the offset for the RMSI or ARFCN. In another embodiment, additional signaling is performed specifically for the purpose of indicating the second resource grid location/particular RB location.

Additional signaling provides information for the second resource grid. In the examples described below, the additional signaling is RRC signaling, but other types of signaling may alternatively be used, for example OSI, or UE-specific signaling may be used.

The provided information indicates the location of a RB boundary for a given SCS relative to the location of:
 SSB; grid for RMSI or lowest RB of RMSI
 grid for RSMI CORESET or lowest RB of RMSI CORESET More specifically, in a first example, the UE determines the second grid/particular RB location based on the RRC signaling and the location of the SSB.

In a second example, the UE determines the second resource grid/particular RB location based on the RRC signaling and the resource grid used for RMSI or lowest RB of RMSI.

In a third example, the UE determines the second resource grid/particular RB location based on the RRC signaling and the resource grid used for RMSI CORESET or lowest RB of RMSI CORESET.

In a fourth example, the UE determines the second resource grid based on the RRC signaling and the resource grid of maximum SCS used for either of SSB and RSMI. For example, if the SCS for SSB is 15 kHz, and the SCS for RMSI is 40 kHz, then the maximum SCS is 30 kHz.

In a first set of examples referred to as option A, use is made of the 4 or 5 bits indicating subcarrier offset, where the bits indicate the offset in the units of subcarrier spacing between the edge of SSB and the resource grid of RB for RMSI or RMSI CORESET, as described above. Examples will be described with reference to Table 4 below.

TABLE 4

| SCS of SSB (KHz) | SCS of RMSI (KHz) | Additional RRC signaling bits for option A | Additional RRC signaling bits for option B |
|---|---|---|---|
| 15 | 15 | 2 bits | 1 bit |
| 15 | 30 | 1 bit | 1 bit |
| 30 | 15 | 1 bit | 0 bit |
| 30 | 30 | 1 bit | 0 bit |

In the first row of Table 4 for option A, the SCS for PBCH is 15 kHz, and the SCS for RMSI is 15 kHz, and 5 bits are used to specify the offset for the RMSI. If the SCS for second resource grid can be 15, 30 or 60 kHz, an additional 2 bits can be used to specify the location of the second resource grid, in units of 15 kHz offset from the RMSI grid/lowest PRB of RMSI (specified by the first offset). The two bits can be used to specify one of four offsets: 0, 15, 30, or 45 kHz.

In the second row of Table 4 for option A, the SCS for SSB is 15 kHz, and the SCS for RMSI is 30 kHz. In this case, 5 bits are used to specify the offset for the RMSI as before. If another second resource grid (e.g. for data) can have 15, 30 or 60 kHz SCS, an additional 1 bit can be used to specify the location of the second resource grid, in units of 30 kHz (i.e. 0, 30 kHz) offset from the RMSI grid/lowest RB of RMSI (specified by the first offset).

In the third and fourth row of Table 4 for option A, the SCS for SSB is 30 kHz, and the SCS for RMSI is 15 kHz or 30 kHz. In this case, 5 bits are used to specify the offset for the RMSI as before. If another second resource grid (e.g. for data) can have 15, 30 or 60 kHz, an additional 1 bit can be used to specify the location of the second resource grid, in units of 30 kHz (i.e. 0, 30 kHz) offset from the RMSI grid/lowest RB of RMSI (specified by the first offset).

Figure 7:
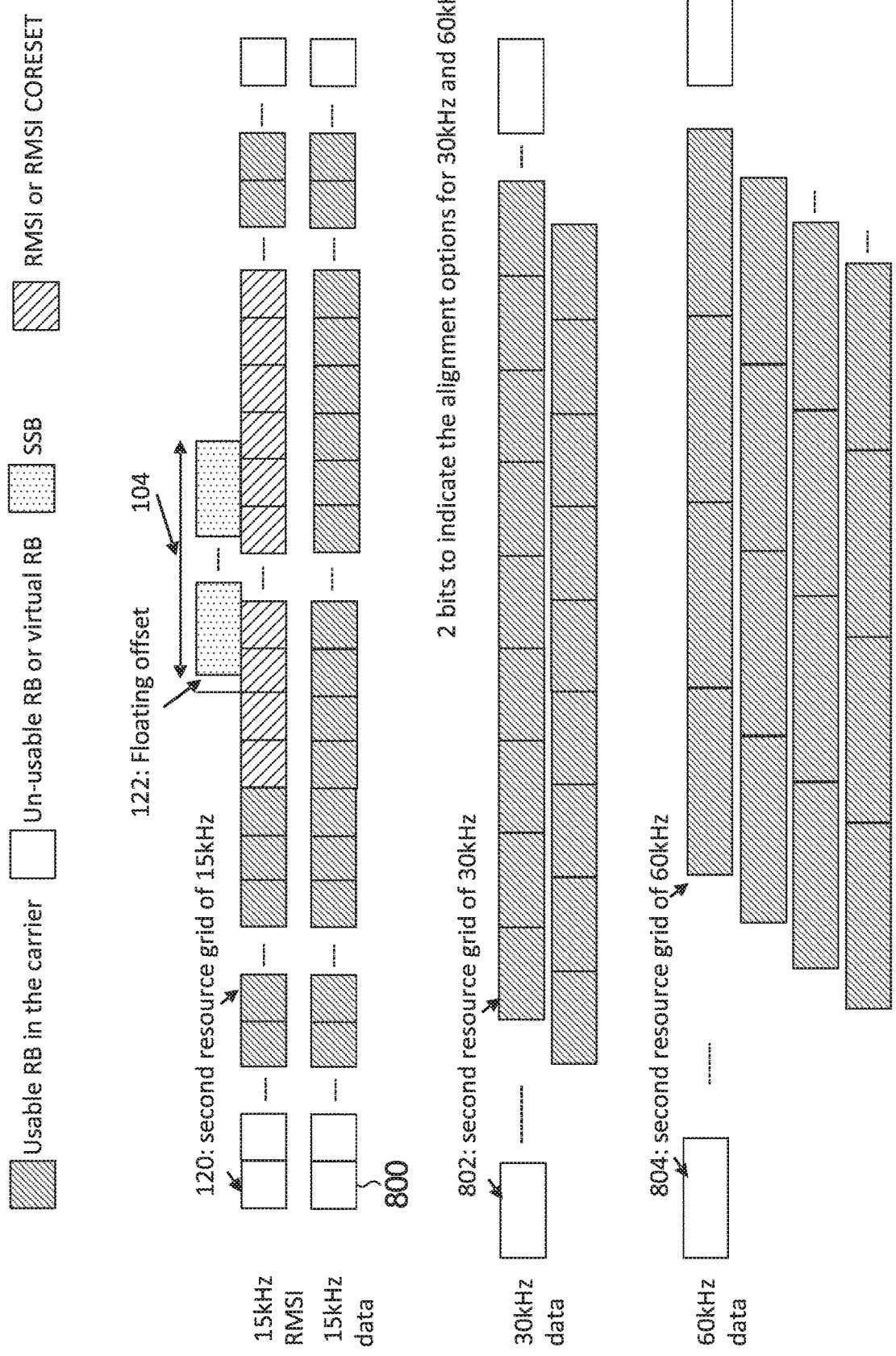

The four examples in Table 4 for option A are depicted in FIG. 7. FIG. 7 shows for SSB 104 with 15 kHz SCS, and a floating offset 122 between the SSB 104 and a second resource grid 120 for RSMI using second resource grid with 15 kHz SCS. With this embodiment, the second resource grid 800 for 15 kHz data is aligned with grid 120. The second resource grid 802 for 30 kHz data has two alignment options with grid 120. The second resource grid 804 for 60 kHz data has four alignment options with grid 120.

To support all of the four examples in Table 4 for option A, 2 bits RRC signaling are indicated to UE.

In another embodiments, 4 or 5 bits are used to indicate the offset in units of the subcarrier for SSB between the edge of SSB with SCS $f_o$ and an RB grid of SCS $2f_o$. This is used to situate the RB grid of SCS $2f_o$. Depending on the actual SCS for the second resource grid, additional signaling is used to locate a second resource grid for the actual SCS, relative to the resource grid SCS $2f_o$. This is referred to as "Option B" in Table 4 below. These bits may also be used to situate the RMSI as before.

In the first row of Table 4 for option B, the SCS for SSB is 15 kHz, and the SCS for RMSI is 15 kHz, and 4 or 5 bits are used to specify the offset for the RMSI. This offset is also used to locate a resource grid of SCS $2f_o$=30 kHz. If SCS for the second resource grid (e.g. for data) can be 15, 30 or 60 kHz, an additional 1 bit can be used to specify the location of the resource grid, in units of 15 kHz (i.e. 0, 15, kHz) offset from the resource grid of SCS=$2f_o$.

In the second row of Table 4 for option B, the SCS for SSB is 15 kHz, and the SCS for RMSI is 30 kHz. In this case, 5 bits are used to specify the offset for the RMSI. This offset is also used to locate a resource grid of SCS $2f_o$=30 kHz. If SCS for a second resource grid (e.g. for data) can be 15, 30 or 60 kHz, an additional 1 bit can be used to specify the location of the second resource grid, in units of 15 kHz (i.e. 0, 15, kHz) offset from the resource grid with SCS=$2f_o$.

In the third and fourth row of Table 4 for option B, the SCS for SSB is 30 kHz, and the SCS for RMSI is 15 kHz or 30 kHz. In this case, 4 or 5 bits are used to specify the offset for the RMSI. This offset is also is used to locate a resource grid of SCS $2f_o$=60 kHz. If SCS for a second resource grid (e.g. for data) can be 15, 30 or 60 kHz, no additional bits are needed to specify the location of the second resource grid.

Figure 8:
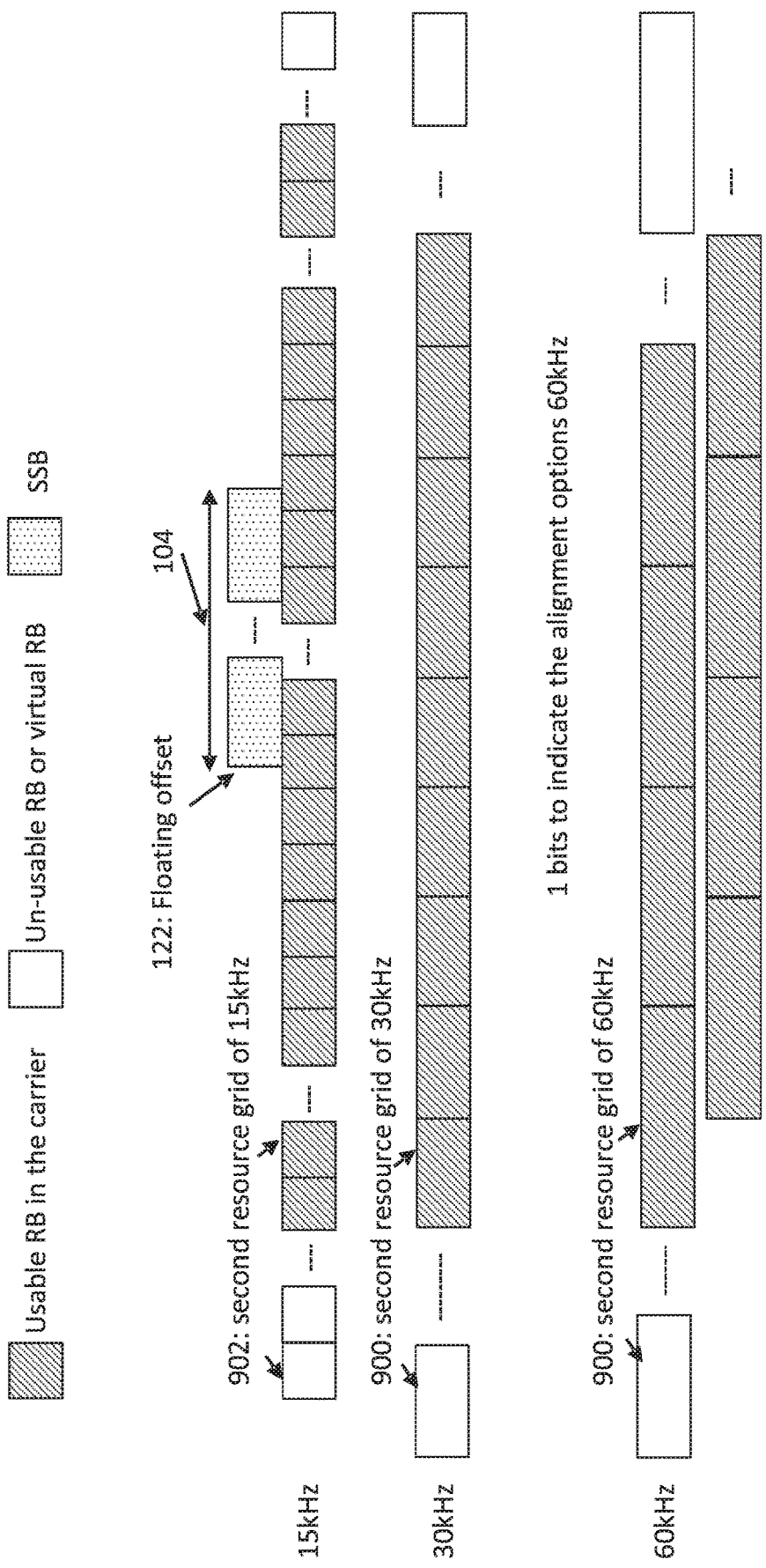

The four examples in Table 4 or option B are depicted in FIG. 8. FIG. 8 shows SSB 104 with $f_o$=15 kHz SCS, and a floating offset 122 between the SSB 100 and a grid 900 having $2 \times f_o$=30 kHz. With this embodiment, a second resource grid 902 for 15 kHz data is aligned with grid 900. A second resource grid for 30 kHz data is the same as grid 900. A resource grid 906 for 60 kHz data has two alignment options with grid 900.

Table 5 below contains further examples.

TABLE 5

| SCS of SSB (KHz) | SCS of RMSI (KHz) | Additional RRC signaling bits | |
|---|---|---|---|
| | | Option A | Option B |
| 120 | 60, 120 | 1 bits | 0 bit |
| 240 | 60, 120 | 0 bit | 0 bit |

In some embodiments, the additional signaling is transmitted using RRC signaling, for example using the RMSI, OSI, or UE-specific signaling. In another embodiment, the additional signaling is transmitted using downlink control information (DCI) signaling.

FIGS. 9 to 19 are flowcharts of methods provided by embodiments of the invention.

Figure 9:
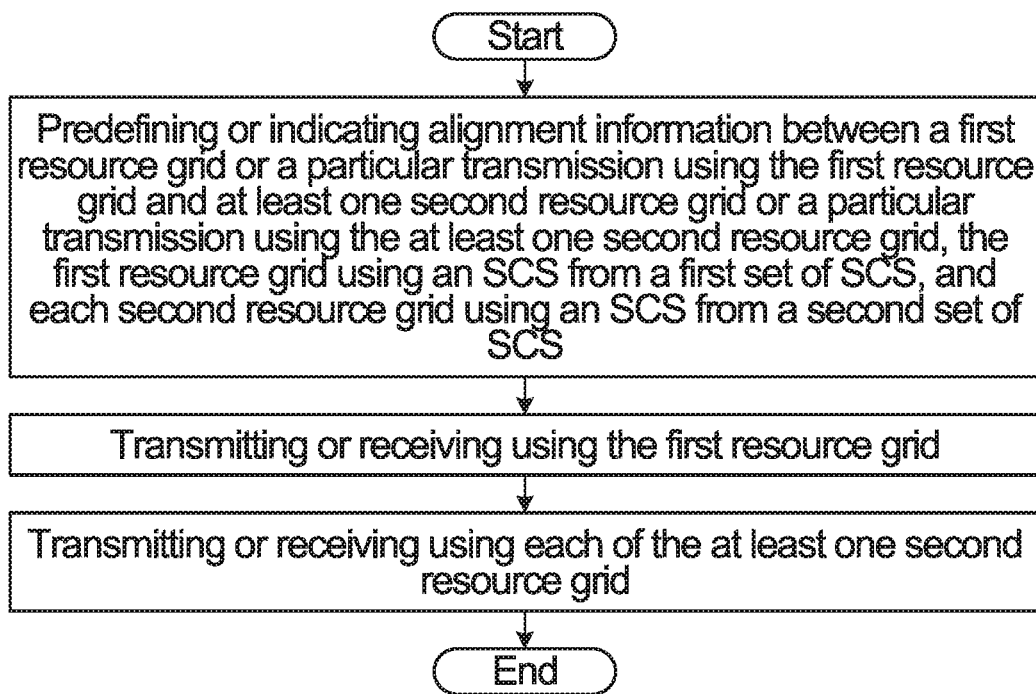
FIGS. 9 to 19 are flowcharts of methods provided by embodiments of the invention.

FIG. 9 is a flowchart of a method provided in an embodiment of the application. The method begins in block 900 with predefining or indicating alignment information between a first resource grid or a particular transmission using the first resource grid and at least one second resource grid or a particular transmission using the at least one second resource grid, the first resource grid using an SCS from a first set of SCS, and each second resource grid using an SCS from a second set of SCS. The method continues in block 902 with transmitting or receiving using the first resource grid. The method continues in block 904 with transmitting or receiving using each of the at least one second resource grid.

Figure 10:
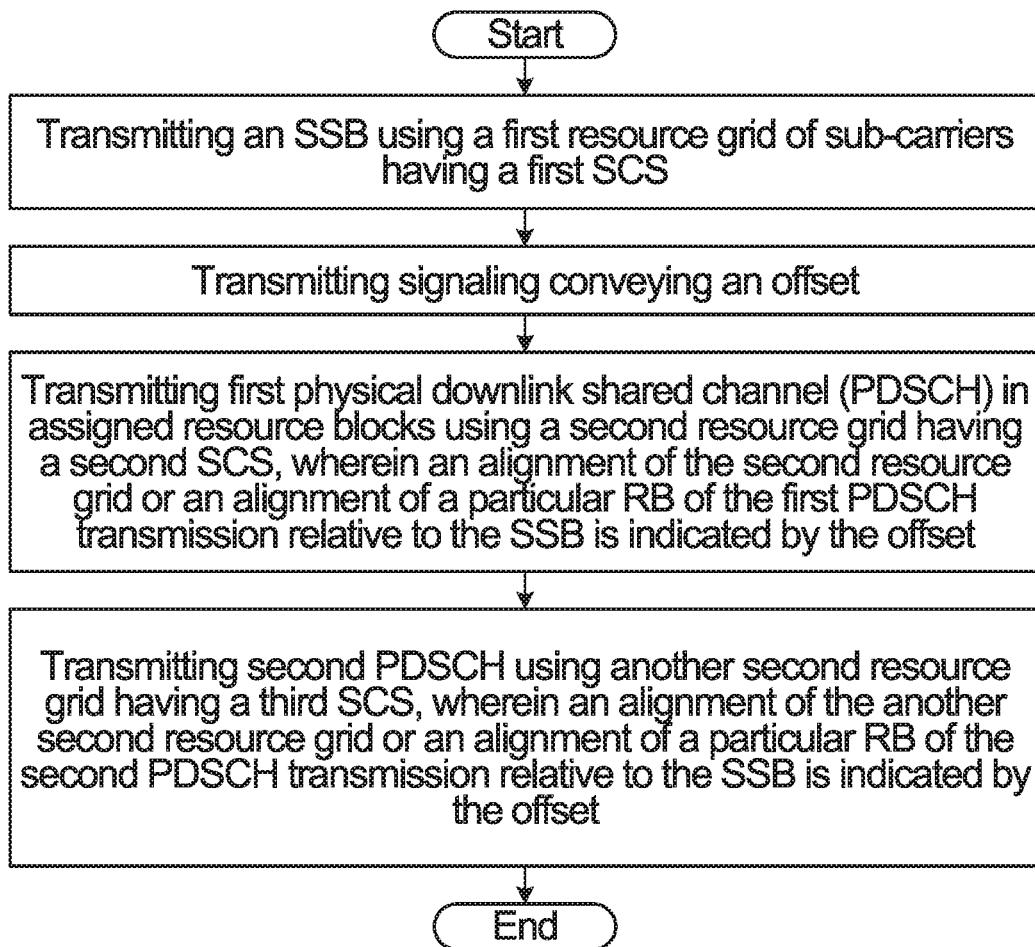

FIG. 10 is a flowchart of a method provided an embodiment of the application. The method begins in block 1000 with transmitting an SSB using a first resource grid of sub-carriers having a first SCS. The method continues in block 1002 with transmitting signaling conveying an offset. The method continues in block 1004 with transmitting first physical downlink shared channel (PDSCH) in assigned resource blocks using a second resource grid having a second SCS, wherein an alignment of the second resource grid or an alignment of a particular RB of the first PDSCH transmission relative to the SSB is indicated by the offset. The method continues in block 1006 with transmitting second PDSCH using another second resource grid having a third SCS, wherein an alignment of the another second resource grid or an alignment of a particular RB of the second PDSCH transmission relative to the SSB is indicated by the offset.

Figure 11:
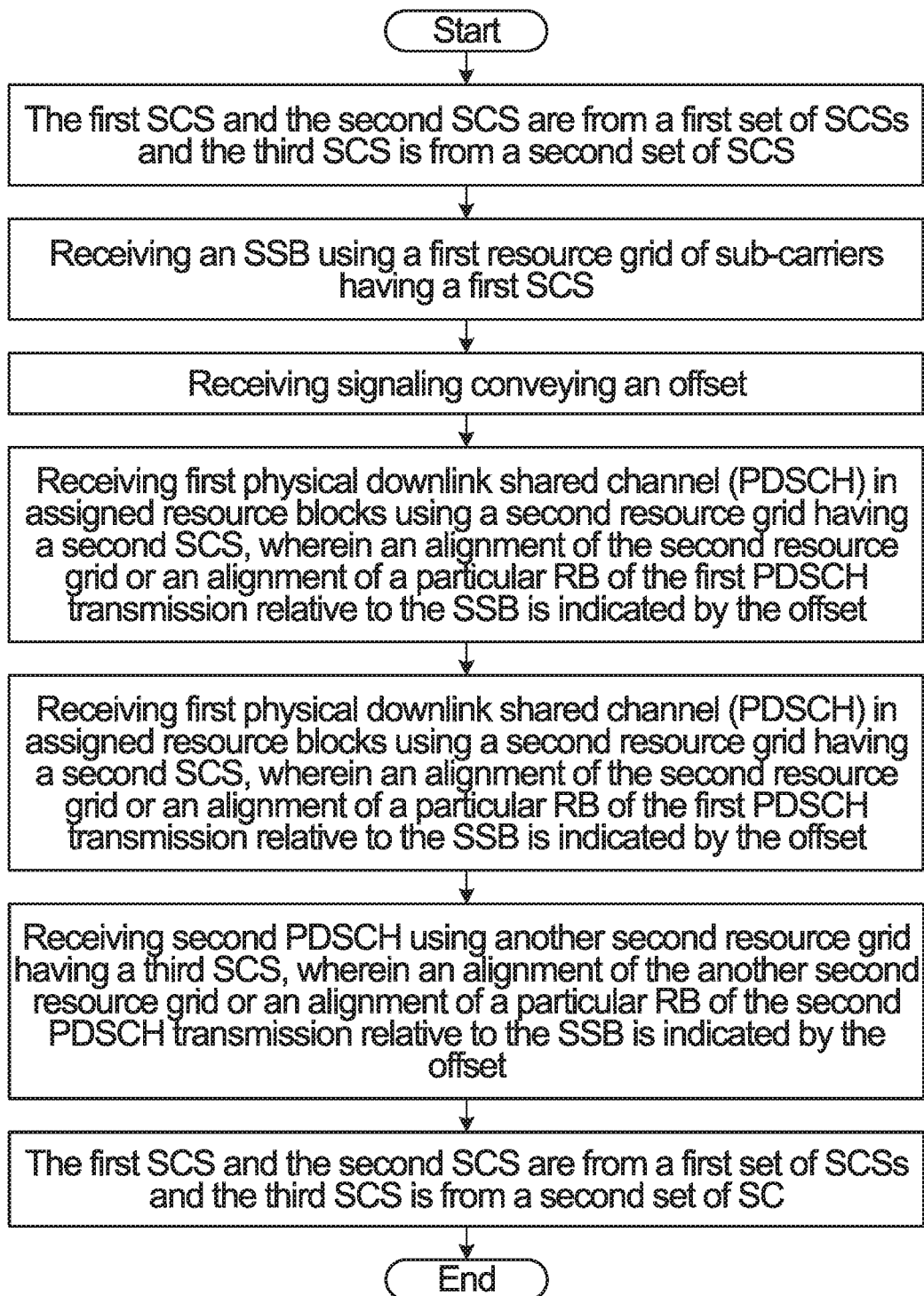

FIG. 11 is a flowchart of a method provided an embodiment of the application. The method begins in block 1100 with the first SCS and the second SCS are from a first set of SCSs and the third SCS is from a second set of SCS. The method continues in block 1102 with receiving an SSB using a first resource grid of sub-carriers having a first SCS. The method continues in block 1104 with receiving signaling conveying an offset. The method continues in block 1106 with receiving first physical downlink shared channel (PDSCH) in assigned resource blocks using a second resource grid having a second SCS, wherein an alignment of the second resource grid or an alignment of a particular RB of the first PDSCH transmission relative to the SSB is indicated by the offset. The method continues in block 1108 with receiving first physical downlink shared channel (PDSCH) in assigned resource blocks using a second resource grid having a second SCS, wherein an alignment of the second resource grid or an alignment of a particular RB of the first PDSCH transmission relative to the SSB is indicated by the offset. The method continues in block 1110 with receiving second PDSCH using another second resource grid having a third SCS, wherein an alignment of the another second resource grid or an alignment of a particular RB of the second PDSCH transmission relative to the SSB is indicated by the offset. The method continues in block 1112 with the first SCS and the second SCS are from a first set of SCSs and the third SCS is from a second set of SC.

Figure 12:
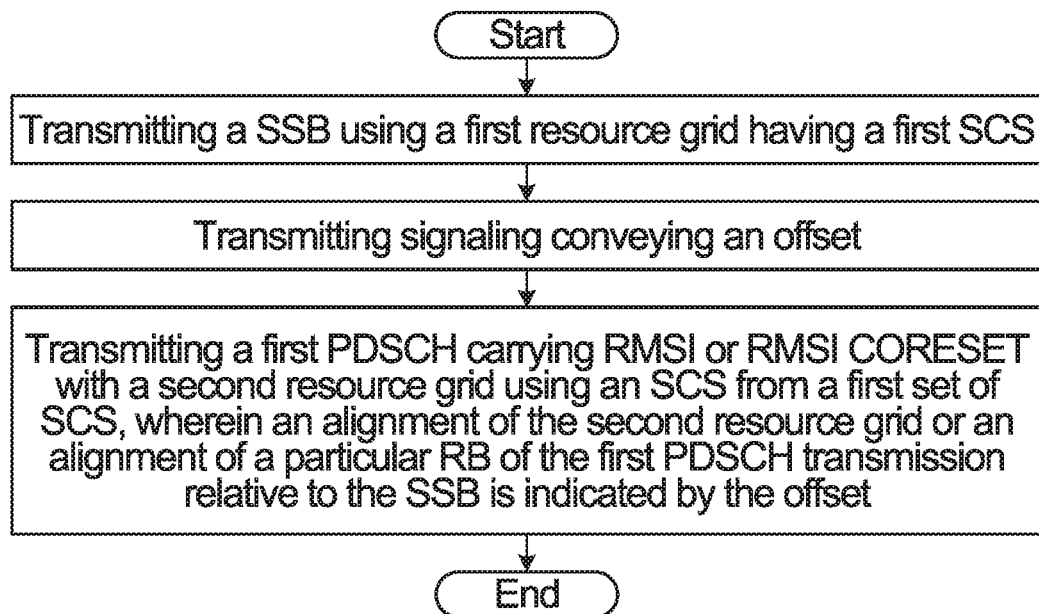

FIG. 12 is a flowchart of a method provided an embodiment of the application. The method begins in block 1200 with transmitting a SSB using a first resource grid having a first SCS. The method continues in block 1202 with transmitting signaling conveying an offset. The method continues in block 1204 with transmitting a first PDSCH carrying RMSI or RMSI CORESET with a second resource grid using an SCS from a first set of SCS, wherein an alignment of the second resource grid or an alignment of a particular RB of the first PDSCH transmission relative to the SSB is indicated by the offset.

Figure 13:
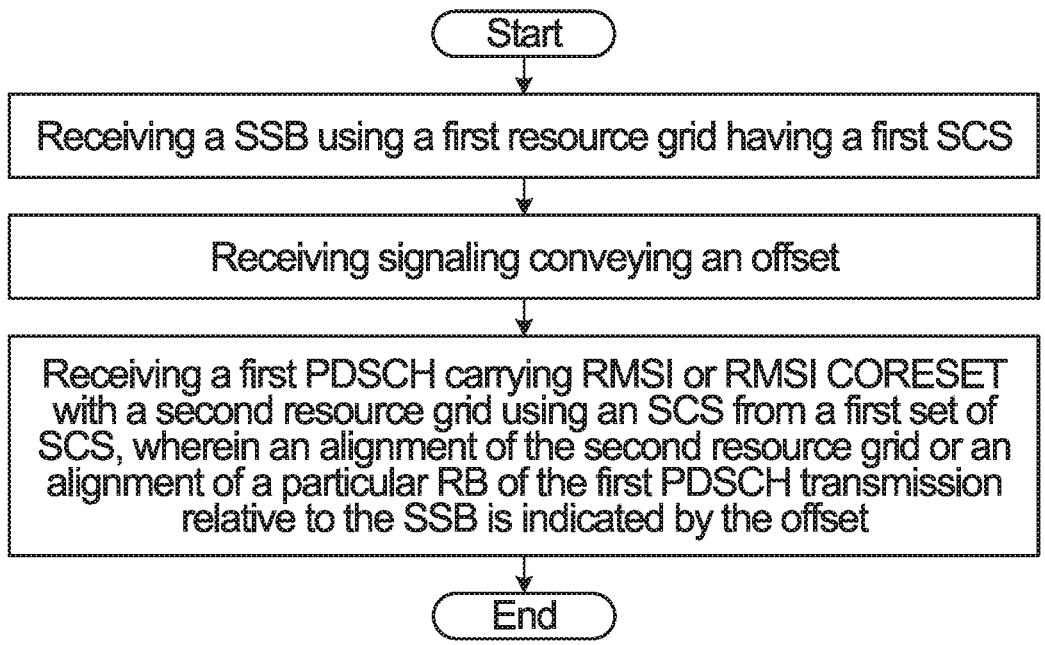

FIG. 13 is a flowchart of a method provided an embodiment of the application. The method begins in block 1300 with receiving a SSB using a first resource grid having a first SCS. The method continues in block 1302 with receiving signaling conveying an offset. The method continues in block 1304 with receiving a first PDSCH carrying RMSI or RMSI CORESET with a second resource grid using an SCS from a first set of SCS, wherein an alignment of the second resource grid or an alignment of a particular RB of the first PDSCH transmission relative to the SSB is indicated by the offset.

Figure 14:
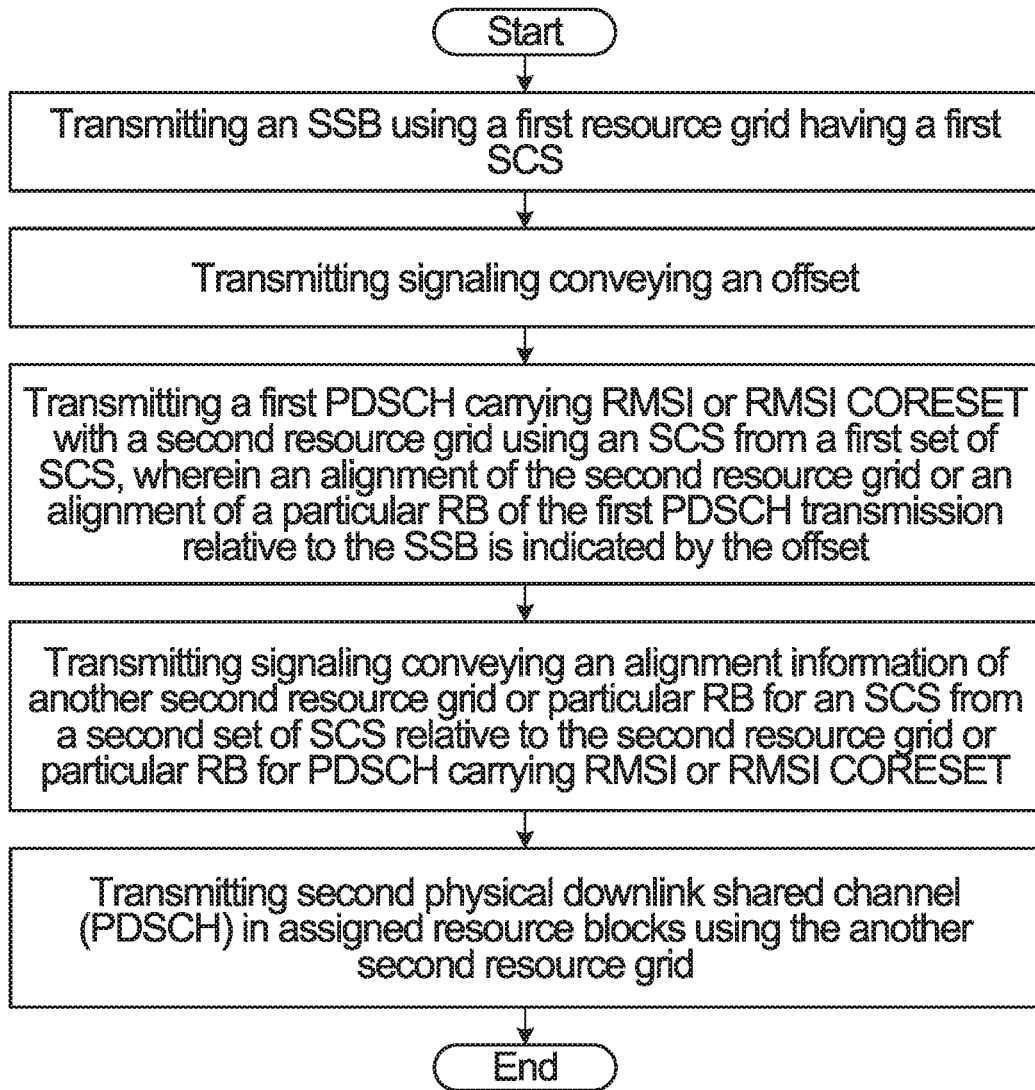

FIG. 14 is a flowchart of a method provided an embodiment of the application. The method begins in block 1400 with transmitting an SSB using a first resource grid having a first SCS. The method continues in block 1402 with transmitting signaling conveying an offset. The method continues in block 1404 with transmitting a first PDSCH carrying RMSI or RMSI CORESET with a second resource grid using an SCS from a first set of SCS, wherein an alignment of the second resource grid or an alignment of a particular RB of the first PDSCH transmission relative to the SSB is indicated by the offset. The method continues in block 1406 with transmitting signaling conveying an alignment information of another second resource grid or particular RB for an SCS from a second set of SCS relative to the second resource grid or particular RB for PDSCH carrying RMSI or RMSI CORESET. The method continues in block 1408 with transmitting second physical downlink shared channel (PDSCH) in assigned resource blocks using the another second resource grid.

Figure 15:
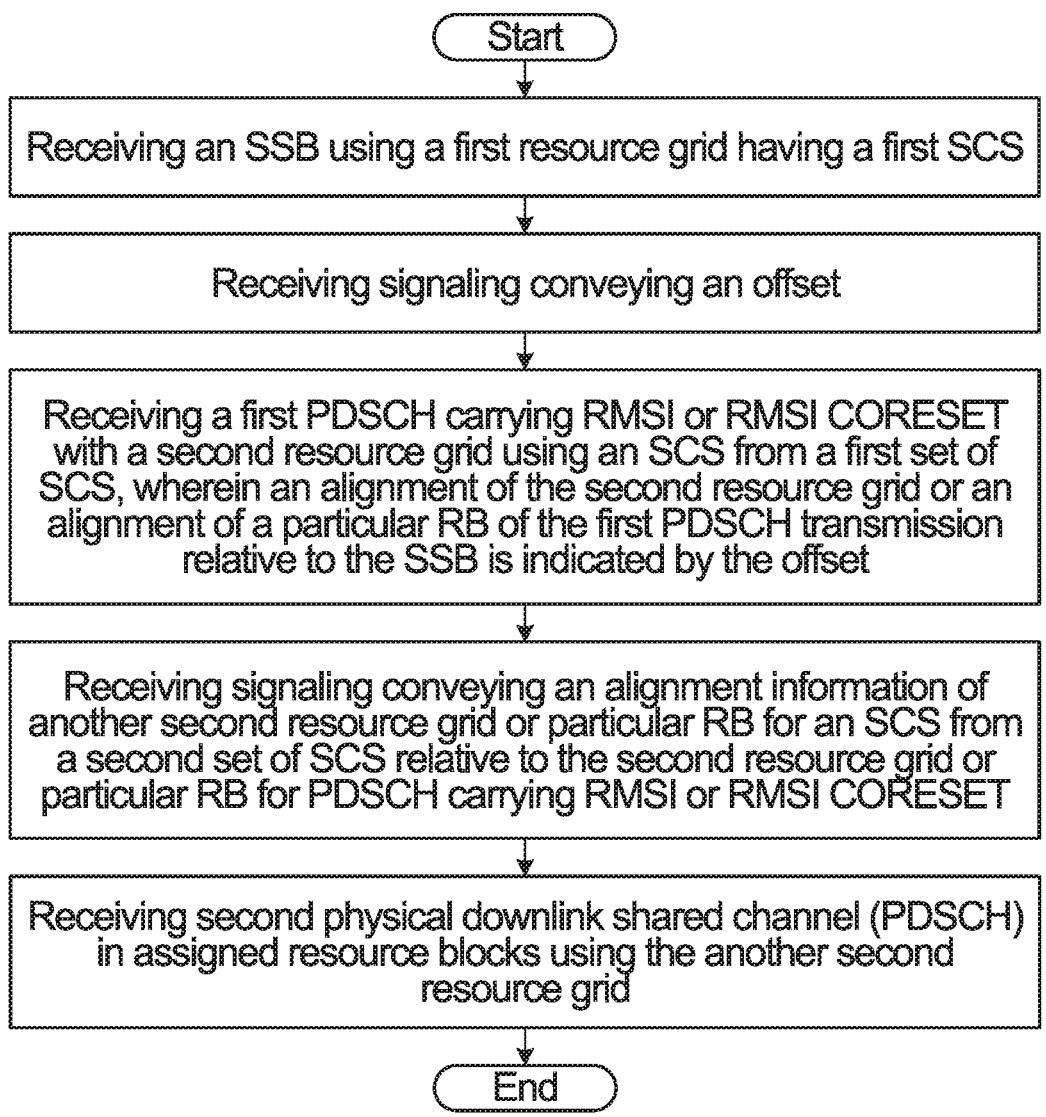

FIG. 15 is a flowchart of a method provided an embodiment of the application. The method begins in block 1500 with receiving an SSB using a first resource grid having a first SCS. The method continues in block 1502 with receiving signaling conveying an offset. The method continues in block 1504 with receiving a first PDSCH carrying RMSI or RMSI CORESET with a second resource grid using an SCS from a first set of SCS, wherein an alignment of the second resource grid or an alignment of a particular RB of the first PDSCH transmission relative to the SSB is indicated by the offset. The method continues in block 1506 with receiving signaling conveying an alignment information of another second resource grid or particular RB for an SCS from a second set of SCS relative to the second resource grid or particular RB for PDSCH carrying RMSI or RMSI CORESET. The method continues in block 1508 with receiving second physical downlink shared channel (PDSCH) in assigned resource blocks using the another second resource grid.

Figure 16:
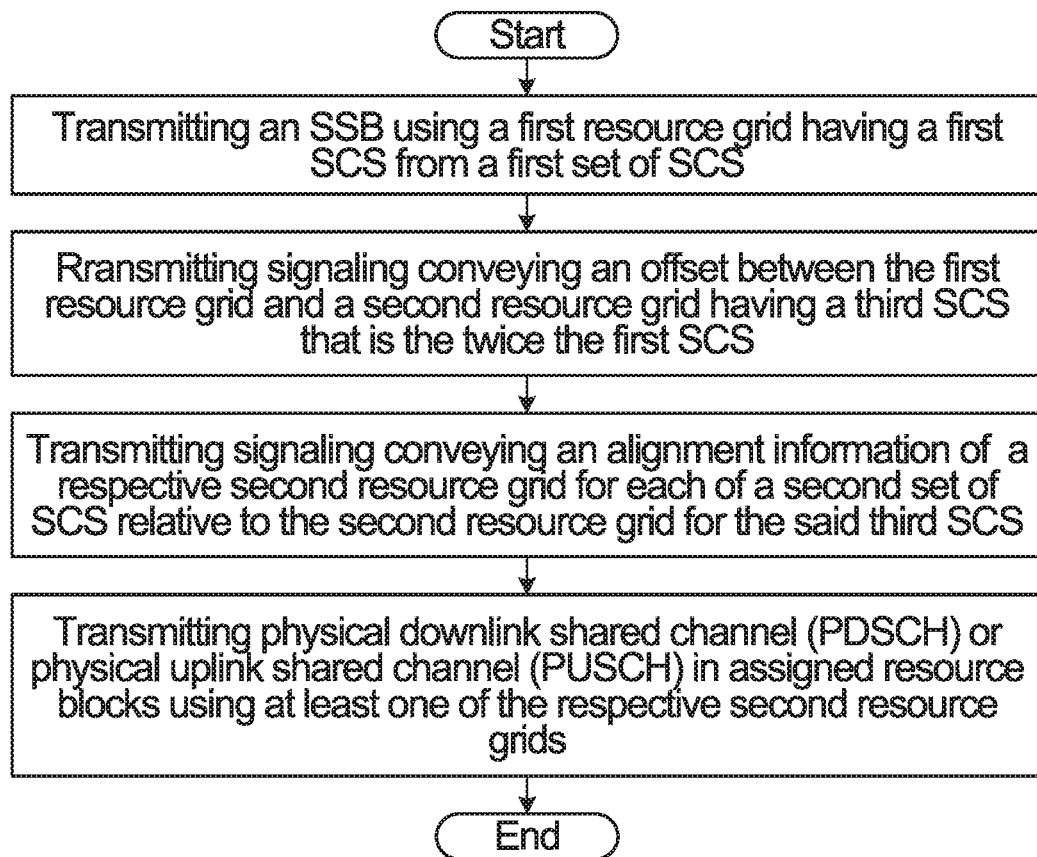

FIG. 16 is a flowchart of a method provided an embodiment of the application. The method begins in block 1600 with transmitting an SSB using a first resource rid having a first SCS from a first set of SCS. The method continues in block 1602 with transmitting signaling conveying an offset between the first resource grid and a second resource grid having a third SCS that is the twice the first SCS. The method continues in block 1604 with transmitting signaling conveying an alignment information of a respective second resource grid for each of a second set of SCS relative to the second resource grid for the said third SCS. The method continues in block 1606 with transmitting physical downlink shared channel (PDSCH) or physical uplink shared channel (PUSCH) in assigned resource blocks using at least one of the respective second resource grids.

Figure 17:
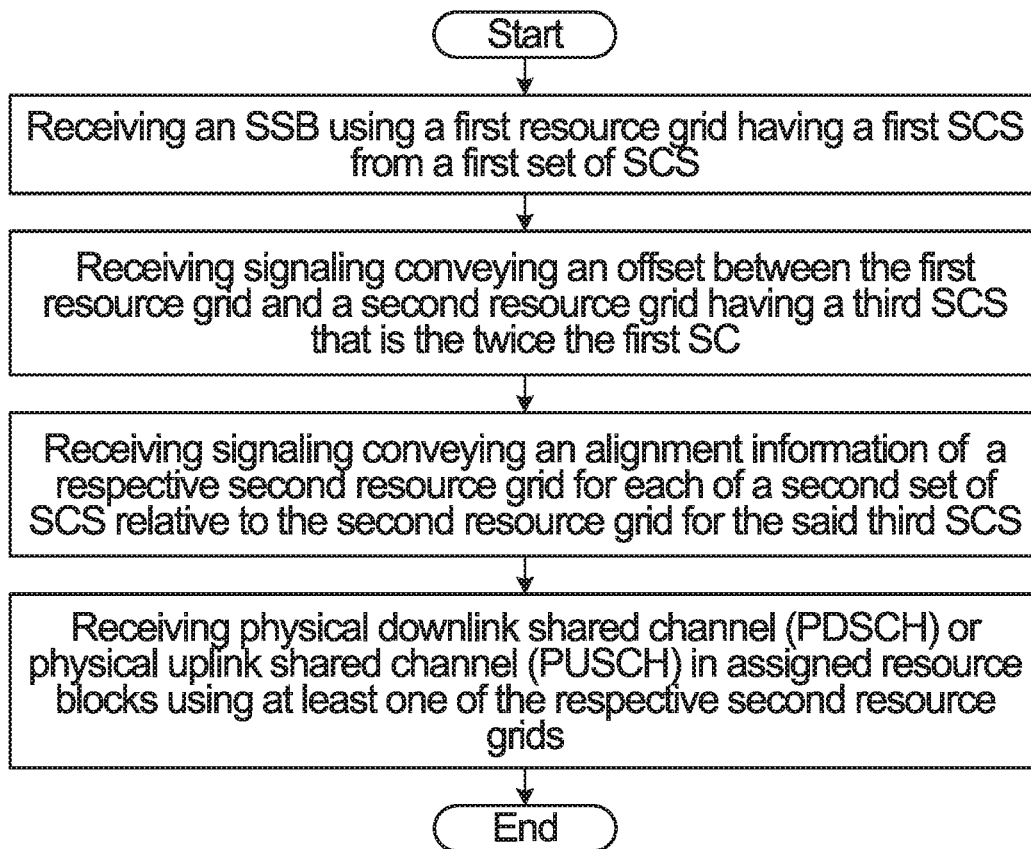

FIG. 17 is a flowchart of a method provided an embodiment of the application. The method begins in block 1700 with receiving an SSB using a first resource grid having a first SCS from a first set of SCS. The method continues in block 1702 with receiving signaling conveying an offset between the first resource and a second resource grid having a third SCS that is the twice the first SC. The method continues in block 1704 with receiving signaling conveying an alignment information of a respective second resource grid for each of a second set of SCS relative to the second resource grid for the said third SCS. The method continues in block 1706 with receiving physical downlink shared channel (PDSCH) or physical uplink shared channel (PUSCH) in assigned resource blocks using at least one of the respective second resource grids.

Figure 18:
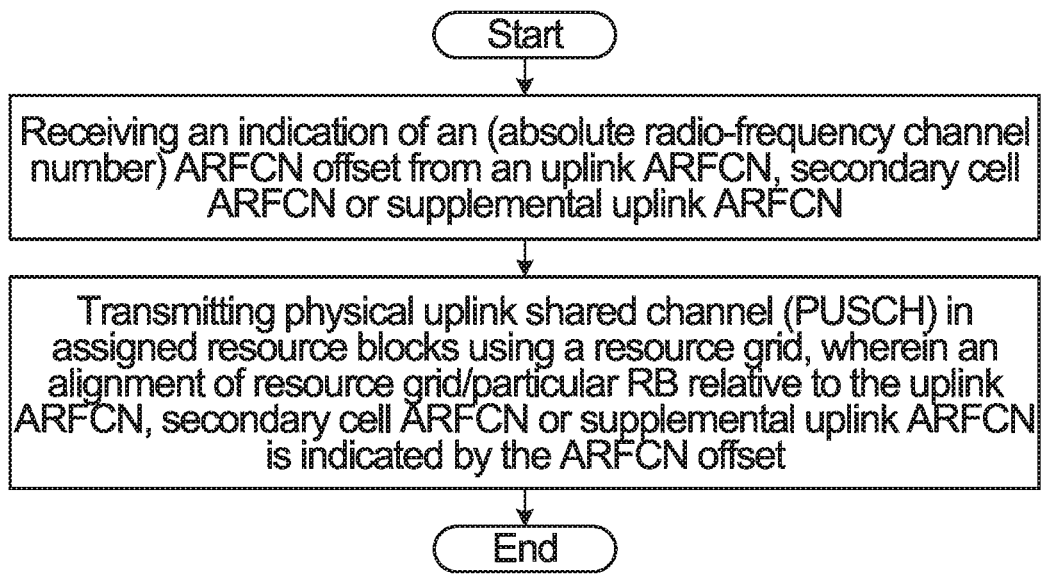

FIG. 18 is a flowchart of a method provided an embodiment of the application. The method begins in block 1800 with receiving an indication of an (absolute radio-frequency channel number) ARFCN offset from an uplink ARFCN, secondary cell ARFCN or supplemental uplink ARFCN. The method continues in block 1802 with transmitting physical uplink shared channel (PUSCH) in assigned resource blocks using a resource grid, wherein an alignment of resource grid/particular RB relative to the uplink ARFCN, secondary cell ARFCN or supplemental uplink ARFCN is indicated by the ARFCN offset.

Figure 19:
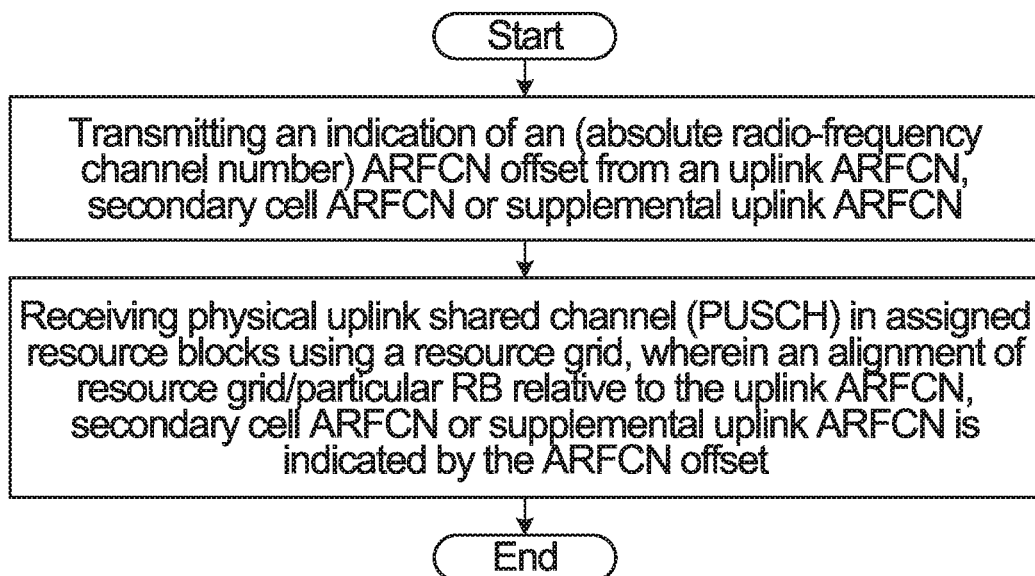

FIG. 19 is a flowchart of a method provided an embodiment of the application. The method begins in block 1900 with transmitting an indication of an (absolute radio-frequency channel number) ARFCN offset from an uplink ARFCN, secondary cell ARFCN or supplemental uplink ARFCN. The method continues in block 1902 with receiving physical uplink shared channel (PUSCH) in assigned resource blocks using a resource grid, wherein an alignment of resource grid/particular RB relative to the uplink ARFCN, secondary cell ARFCN or supplemental uplink ARFCN is indicated by the ARFCN offset.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2A:
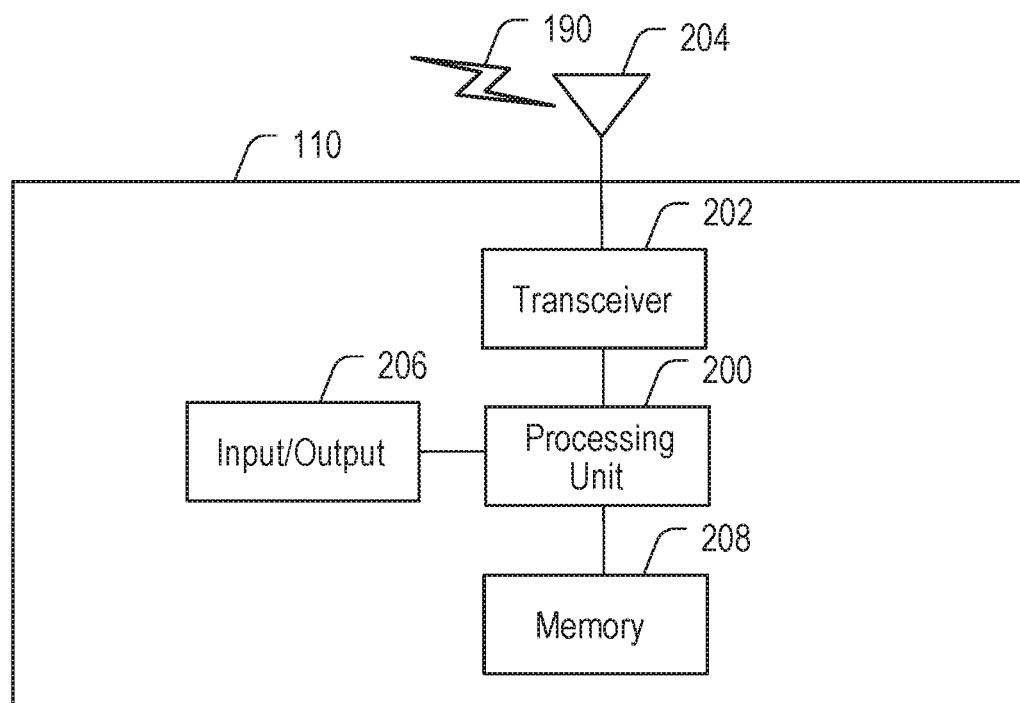
FIG. 2A is a block diagram of an example electronic device.
Figure 2B:
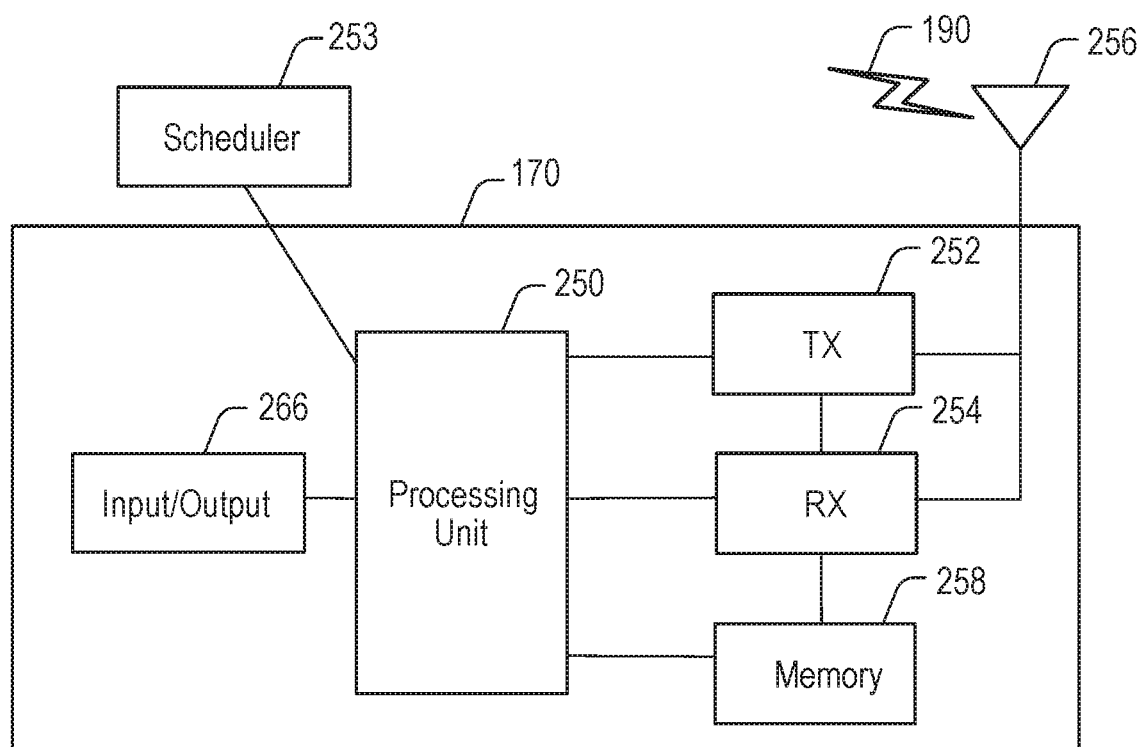
FIG. 2B is a block diagram of an example electronic device.

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED no includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED no also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED no further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED no includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED no. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Frame structures have been proposed that are flexible in terms of the use of differing numerologies. A numerology is defined as the set of physical layer parameters of the air interface that are used to communicate a particular signal. A numerology is described in terms of at least SCS and OFDM symbol duration, and may also be defined by other parameters such as fast Fourier transform (FFT)/inverse FFT (IFFT) length, transmission time slot length, and cyclic prefix (CP) length or duration. In some implementations, the definition of the numerology may also include which one of several candidate waveforms is used to communicate the signal. Possible waveform candidates may include, but are not limited to, one or more orthogonal or non-orthogonal waveforms selected from the following: Orthogonal Frequency Division Multiplexing (OFDM), Filtered OFDM (f-OFDM), Filter Bank Multicarrier (FBMC), Universal Filtered Multicarrier (UFMC), Generalized Frequency Division Multiplexing (GFDM), Single Carrier Frequency Division Multiple Access (SC-FDMA), Low Density Signature Multicarrier Code Division Multiple Access (LDS-MC-CDMA), Wavelet Packet Modulation (WPM), Faster Than Nyquist (FTN) Waveform, low Peak to Average Power Ratio Waveform (low PAPR WF), Pattern Division Multiple Access (PDMA), Lattice Partition Multiple Access (LPMA), Resource Spread Multiple Access (RSMA), and Sparse Code Multiple Access (SCMA).

These numerologies may be scalable in the sense that SCSs of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

According to one aspect of the present invention, there is provided a method comprising: predefining or indicating alignment information between a first resource grid or a particular transmission using the first resource grid and at least one second resource grid or a particular transmission using the at least one second resource grid, the first resource grid using an SCS from a first set of SCS, and each second resource grid using an SCS from a second set of SCS; transmitting or receiving using the first resource grid; transmitting or receiving using each of the at least one second resource grid.

Optionally, predefining or indicating alignment information comprises transmitting the alignment information.

Optionally, predefining or indicating alignment information comprises receiving the alignment information.

According to another aspect of the present invention, there is provided a method comprising: transmitting an SSB using a first resource grid of sub-carriers having a first SCS; transmitting signaling conveying an offset; transmitting first physical downlink shared channel (PDSCH) in assigned resource blocks using a second resource grid having a second SCS, wherein an alignment of the second resource grid or an alignment of a particular RB of the first PDSCH transmission relative to the SSB is indicated by the offset; transmitting second PDSCH using another second resource grid having a third SCS, wherein an alignment of the another second resource grid or an alignment of a particular RB of the second PDSCH transmission relative to the SSB is indicated by the offset; wherein the first SCS and the second SCS are from a first set of SCSs and the third SCS is from a second set of SCS.

According to another aspect of the present invention, there is provided a method comprising: receiving an SSB using a first resource grid of sub-carriers having a first SCS; receiving signaling conveying an offset; receiving first physical downlink shared channel (PDSCH) in assigned resource blocks using a second resource grid having a second SCS, wherein an alignment of the second resource grid or an alignment of a particular RB of the first PDSCH transmission relative to the SSB is indicated by the offset; receiving second PDSCH using another second resource grid having a third SCS, wherein an alignment of the another second resource grid or an alignment of a particular RB of the second PDSCH transmission relative to the SSB is indicated by the offset; wherein the first SCS and the second SCS are from a first set of SCSs and the third SCS is from a second set of SCS.

According to another aspect of the present invention, there is provided a method comprising: transmitting a SSB using a first resource grid having a first SCS; transmitting signaling conveying an offset; transmitting a first PDSCH carrying RMSI or RMSI CORESET with a second resource grid using an SCS from a first set of SCS, wherein an alignment of the second resource grid or an alignment of a particular RB of the first PDSCH transmission relative to the SSB is indicated by the offset.

Optionally, the method further comprises transmitting a second PDSCH using another second resource grid with an SCS from a second set of SCS, wherein subcarrier o for the second set SCS coincide with subcarrier o for the first set SCS in the lowest resource block for PDSCH carrying RMSI or RMSI CORESET.

According to another aspect of the present invention, there is provided a method comprising: receiving a SSB using a first resource grid having a first SCS receiving signaling conveying an offset; receiving a first PDSCH carrying RMSI or RMSI CORESET with a second resource grid using an SCS from a first set of SCS, wherein an alignment of the second resource grid or an alignment of a particular RB of the first PDSCH transmission relative to the SSB is indicated by the offset.

According to another aspect of the present invention, there is provided a method comprising: transmitting an SSB using a first resource grid having a first SCS; transmitting signaling conveying an offset; transmitting a first PDSCH carrying RMSI or RMSI CORESET with a second resource grid using an SCS from a first set of SCS, wherein an alignment of the second resource grid or an alignment of a particular RB of the first PDSCH transmission relative to the SSB is indicated by the offset; transmitting signaling conveying an alignment information of another second resource grid or particular RB for an SCS from a second set of SCS relative to the second resource grid or particular RB for PDSCH carrying RMSI or RMSI CORESET; transmitting second physical downlink shared channel (PDSCH) in assigned resource blocks using the another second resource grid.

According to another aspect of the present invention, there is provided a method comprising: receiving an SSB using a first resource grid having a first SCS; receiving signaling conveying an offset; receiving a first PDSCH carrying RMSI or RMSI CORESET with a second resource grid using an SCS from a first set of SCS, wherein an alignment of the second resource grid or an alignment of a particular RB of the first PDSCH transmission relative to the SSB is indicated by the offset; receiving signaling conveying an alignment information of another second resource grid or particular RB for an SCS from a second set of SCS relative to the second resource grid or particular RB for PDSCH carrying RMSI or RMSI CORESET; receiving second physical downlink shared channel (PDSCH) in assigned resource blocks using the another second resource grid.

According to another aspect of the present invention, there is provided a method comprising: transmitting an SSB using a first resource grid having a first SCS from a first set of SCS; transmitting signaling conveying an offset between the first resource grid and a second resource grid having a third SCS that is the twice the first SCS; transmitting signaling conveying an alignment information of a respective second resource grid for each of a second set of SCS relative to the second resource grid for the said third SCS; transmitting physical downlink shared channel (PDSCH) or physical uplink shared channel (PUSCH) in assigned resource blocks using at least one of the respective second resource grids.

According to another aspect of the present invention, there is provided a method comprising: receiving an SSB using a first resource grid having a first SCS from a first set of SCS; receiving signaling conveying an offset between the first resource grid and a second resource grid having a third SCS that is the twice the first SCS; receiving signaling conveying an alignment information of a respective second resource grid for each of a second set of SCS relative to the second resource grid for the said third SCS; receiving physical downlink shared channel (PDSCH) or physical uplink shared channel (PUSCH) in assigned resource blocks using at least one of the respective second resource grids.

Optionally, alignment as indicated by an offset means a lowest frequency sub-carrier of one resource grid/SSB/particular RB is offset from a lowest frequency sub-carrier of another resource grid/particular RB by an amount indicated by the offset.

Optionally, the particular resource block is configured by higher layer signaling.

Optionally, the first set of SCS comprises:
{15 kHz, 30 kHz} or {120 kHz, 240 kHz} or {15 kHz, 30 kHz, 120 kHz, 240 kHz }

Optionally, the second set of SCS comprises:
{15 kHz, 30 kHz} or {15 kHz, 60 kHz} or {30 kHz, 60 kHz} or {15 kHz, 30 kHz, 60 kHz} or {120 kHz, 240 kHz} or {60 kHz, 120 kHz} or {60 kHz, 120 kHz, 240 kHz} or {15 kHz, 30 kHz, 60 kHz, 120 kHz, 240 kHz } or {7.5 kHz, 15 kHz} or superset of these said sets.

According to another aspect of the present invention, there is provided a method comprising: receiving an indication of an (absolute radio-frequency channel number) ARFCN offset from an uplink ARFCN, secondary cell ARFCN or supplemental uplink ARFCN; transmitting physical uplink shared channel (PUSCH) in assigned resource blocks using a resource grid, wherein an alignment of resource grid/particular RB relative to the uplink ARFCN, secondary cell ARFCN or supplemental uplink ARFCN is indicated by the ARFCN offset.

According to another aspect of the present invention, there is provided a method comprising: transmitting an indication of an (absolute radio-frequency channel number) ARFCN offset from an uplink ARFCN, secondary cell ARFCN or supplemental uplink ARFCN; receiving physical uplink shared channel (PUSCH) in assigned resource blocks using a resource grid, wherein an alignment of resource grid/particular RB relative to the uplink ARFCN, secondary cell ARFCN or supplemental uplink ARFCN is indicated by the ARFCN offset.

optionally, receiving the indication comprises receiving the indication as part of RMSI or other system information.

Optionally, receiving the indication is performed as part of secondary cell or secondary uplink configuration.

Optionally, the resource grid has an SCS that is one of 15 kHz, 30 kHz, 60 kHz, 120 kHz, and 240 kHz.

Optionally, the offset is indicated using 4 or 5 bits.

According to another aspect of the present invention, there is provided a UE configured to perform one of the methods summarized above or described herein.

According to another aspect of the present invention, there is provided a base station configured to perform the method one of the methods summarized above or described herein.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
    transmitting, by a base station (BS), alignment information between a first resource grid or a particular transmission using the first resource grid, and at least a second resource grid, wherein the first resource grid uses a first sub-carrier spacing (SCS), and the second resource grid uses a second SCS;
    transmitting, by the BS, a synchronization sequence block (SSB) using the first resource grid;
    transmitting, by the BS, a first physical downlink shared channel (PDSCH) transmission using the second resource grid;
    transmitting, by the BS, first signaling conveying an offset indicating the alignment information; and
    transmitting, by the BS, a second PDSCH transmission in assigned resource blocks (RBs) using a third resource grid having a third SCS,
    wherein the alignment information is between a particular resource block (RB) of the at least the second resource grid relative to the SSB, or
    wherein the alignment information is between a particular RB of the third resource grid relative to the SSB.

2. The method of claim 1, wherein the second SCS and the third SCS are from a second set of SCSs comprising one or a superset of {15 kHz, 30 kHz}, {15 kHz, 60 kHz}, {30 kHz, 60 kHz}, {15 kHz, 30 kHz, 60 kHz}, {120 kHz, 240 kHz}, {60 kHz, 120 kHz}, {60 kHz, 120 kHz, 240 kHz}, {15 kHz, 30 kHz, 60 kHz, 120 kHz, 240 kHz }, or {7.5 kHz, 15 kHz}.

3. The method of the claim 1, wherein the second PDSCH transmission carries remaining minimum system information (RMSI).

4. The method of claim 1, wherein the first SCS is from a first set of SCSs comprising one of {15 kHz, 30 kHz}, {120 kHz, 240 kHz}, or {15 kHz, 30 kHz,120 kHz, 240 kHz}.

5. A base station (BS) comprising:
    a processor; and
    a non-transitory computer readable storage medium storing programming for execution by the processor, the programming including instructions to:
        transmit alignment information between a first resource grid or a particular transmission using the first resource grid, and at least a second resource grid, wherein the first resource grid uses a first sub-carrier spacing (SCS), and the second resource grid uses a second SCS;
        transmit a synchronization sequence block (SSB) using the first resource grid;
        transmit a first physical downlink shared channel (PDSCH) transmission using the second resource grid;
        transmit first signaling conveying an offset indicating the alignment information; and
        transmit a second PDSCH transmission in assigned resource blocks (RBs) using a third resource grid having a third SCS,
        wherein the alignment information is between a particular resource block (RB) of the at least the second resource grid relative to the SSB, or
        wherein the alignment information is between a particular RB of the third resource grid relative to the SSB.

6. The BS of claim 5, wherein the second SCS and the third SCS are from a second set of SCSs comprising one or a superset of {15 kHz, 30 kHz}, {15 kHz, 60 kHz}, {30 kHz, 60 kHz}, {15 kHz, 30 kHz, 60 kHz}, {120 kHz, 240 kHz}, {60 kHz, 120 kHz}, {60 kHz, 120 kHz, 240 kHz}, {15 kHz, 30 kHz, 60 kHz, 120 kHz, 240 kHz }, or {7.5 kHz, 15 kHz}.

7. The BS of the claim 5, wherein the second PDSCH transmission carries remaining minimum system information (RMSI).

8. The BS of claim 5, wherein the first SCS is from a first set of SCSs comprising one of {15 kHz, 30 kHz}, {120 kHz, 240 kHz}, or {15 kHz, 30 kHz, 120 kHz, 240 kHz}.

9. A method comprising:
    receiving, by an apparatus, alignment information between a first resource grid or a particular transmission using the first resource grid, and at least a second resource grid, wherein the first resource grid uses a first sub-carrier spacing (SCS), and the second resource grid uses a second SCS;

receiving, by the apparatus, a synchronization sequence block (SSB) using the first resource grid;

receiving, by the UE, a first physical downlink shared channel (PDSCH) transmission using the second resource grid;

receiving, by the apparatus, first signaling conveying an offset indicating the alignment information; and receiving, by the apparatus, a second PDSCH transmission in assigned resource blocks (RBs) using a third resource grid having a third SCS, wherein the alignment information is between a particular resource block (RB) of the at least the second resource grid relative to the SSB, or wherein the alignment information is between a particular RB of the third resource grid relative to the SSB.

10. The method of claim 9, wherein the second SCS and the third SCS are from a second set of SCSs comprising one or a superset of {15 kHz, 30 kHz}, {15 kHz, 60 kHz}, {30 kHz, 60 kHz}, {15 kHz, 30 kHz, 60 kHz}, {120 kHz, 240 kHz}, {60 kHz, 120 kHz}, {60 kHz, 120 kHz, 240 kHz}, {15 kHz, 30 kHz, 60 kHz, 120 kHz, 240 kHz }, or {7.5 kHz, 15 kHz}.

11. The method of the claim 9, wherein the second PDSCH transmission carries remaining minimum system information (RMSI).

12. The method of claim 9, wherein the first SCS is from a first set of SCSs comprising one of {15 kHz, 30 kHz}, {120 kHz, 240 kHz}, or {15 kHz, 30 kHz, 120 kHz, 240 kHz}.

13. An apparatus comprising:
a processor; and
a non-transitory computer readable storage medium storing programming for execution by the processor, the programming including instructions to:
receive alignment information between a first resource grid or a particular transmission using the first resource grid, and at least a second resource grid, wherein the first resource grid uses a first sub-carrier spacing (SCS), and the second resource grid uses a second SCS;
receive a synchronization sequence block (SSB) using the first resource grid;
receive a first physical downlink shared channel (PDSCH) transmission using the second resource grid;
receive first signaling conveying an offset indicating the alignment information; and
receive a second PDSCH transmission in assigned resource blocks (RBs) using a third resource grid having a third SCS,
wherein the alignment information is between a particular resource block (RB) of the at least the second resource grid relative to the SSB, or
wherein the alignment information is between a particular RB of the third resource grid relative to the SSB.

14. The apparatus of claim 13, wherein the second SCS and the third SCS are from a second set of SCSs comprising one or a superset of {15 kHz, 30 kHz}, {15 kHz, 60 kHz}, {30 kHz, 60 kHz}, {15 kHz, 30 kHz, 60 kHz}, {120 kHz, 240 kHz}, {60 kHz, 120 kHz}, {60 kHz, 120 kHz, 240 kHz}, {15 kHz, 30 kHz, 60 kHz, 120 kHz, 240 kHz }, or {7.5 kHz, 15 kHz}.

15. The apparatus of the claim 13, wherein the second PDSCH transmission carries remaining minimum system information (RMSI).

16. The apparatus of claim 13, wherein the first SCS is from a first set of SCSs comprising one of {15 kHz, 30 kHz}, {120 kHz, 240 kHz}, or {15 kHz, 30 kHz, 120 kHz, 240 kHz}.

17. A network system comprising:
a component in a backhaul network communicating data with a base station; and
the base station, the base station configured to:
transmit alignment information between a first resource grid or a particular transmission using the first resource grid, and at least a second resource grid, wherein the first resource grid uses a first sub-carrier spacing (SCS), and the second resource grid uses a second SCS;
transmit a synchronization sequence block (SSB) using the first resource grid;
transmit a first physical downlink shared channel (PDSCH) transmission using the second resource grid;
transmit first signaling conveying an offset indicating the alignment information; and
transmit a second PDSCH transmission in assigned resource blocks (RBs) using a third resource grid having a third SCS,
wherein the alignment information is between a particular resource block (RB) of the at least the second resource grid relative to the SSB, or
wherein the alignment information is between a particular RB of the third resource grid relative to the SSB.

18. The network system of claim 17, wherein the second SCS and the third SCS are from a second set of SCSs comprising one or a superset of {15 kHz, 30 kHz}, {15 kHz, 60 kHz}, {30 kHz, 60 kHz}, {15 kHz, 30 kHz, 60 kHz}, {120 kHz, 240 kHz}, {60 kHz, 120 kHz}, {60 kHz, 120 kHz, 240 kHz}, {15 kHz, 30 kHz, 60 kHz, 120 kHz, 240 kHz }, or {7.5 kHz, 15 kHz}.

19. The network system of the claim 17, wherein the second PDSCH transmission carries remaining minimum system information (RMSI).

20. The network system of claim 17, wherein the first SCS is from a first set of SCSs comprising one of {15 kHz, 30 kHz}, {120 kHz, 240 kHz}, or {15 kHz, 30 kHz, 120 kHz, 240 kHz}.

* * * * *